(12) United States Patent
Ishiguro et al.

(10) Patent No.: US 10,852,459 B2
(45) Date of Patent: Dec. 1, 2020

(54) REFLECTIVE SHEET, DECORATIVE SHEET, AND METHOD OF MANUFACTURING REFLECTIVE SHEET

(71) Applicant: FUJIFILM Corporation, Tokyo (JP)

(72) Inventors: Makoto Ishiguro, Minami-ashigara (JP); Nobuhiko Ichihara, Minami-ashigara (JP); Michio Nagai, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/836,364

(22) Filed: Mar. 31, 2020

(65) Prior Publication Data

US 2020/0225387 A1 Jul. 16, 2020

Related U.S. Application Data

(63) Continuation of application No. PCT/JP2018/037609, filed on Oct. 9, 2018.

(30) Foreign Application Priority Data

Oct. 11, 2017 (JP) .................................. 2017-197766

(51) Int. Cl.
*G02B 5/02* (2006.01)
*B29D 11/00* (2006.01)
(Continued)

(52) U.S. Cl.
CPC ........ *G02B 5/0263* (2013.01); *B29D 11/0074* (2013.01); *G02B 5/0215* (2013.01);
(Continued)

(58) Field of Classification Search
CPC .. G02B 5/0263; G02B 5/0215; G02B 5/0284; G02B 5/20; B29D 11/0074; B29K 2105/0079
See application file for complete search history.

(56) References Cited

U.S. PATENT DOCUMENTS

| 5,506,704 A | 4/1996 | Broer et al. |
| 6,057,008 A | 5/2000 | Schwalb et al. |

(Continued)

FOREIGN PATENT DOCUMENTS

| JP | 6-281814 A | 10/1994 |
| JP | 3272668 B2 | 4/2002 |

(Continued)

OTHER PUBLICATIONS

International Preliminary Report on Patentability and Written Opinion of the International Searching Authority (Forms PCT/IB/326, PCT/IB/373, and PCT/ISA/237), dated Apr. 23, 2020, for International Application No. PCT/JP2018/037609, with an English Translation.

(Continued)

*Primary Examiner* — Nathanael R Briggs
(74) *Attorney, Agent, or Firm* — Birch, Stewart, Kolasch & Birch, LLP

(57) ABSTRACT

Provided are a reflective sheet having selective reflection in a wide wavelength range and a small change in tint depending on angles at which light is visually recognized, a decorative sheet, and a method of manufacturing a reflective sheet, the reflective sheet including a pitch gradient layer in which a helical pitch changes in a thickness direction of the layer. The reflective sheet includes at least one cholesteric liquid crystal layer having wavelength selective reflection properties, in which at least one of the cholesteric liquid crystal layers is a pitch gradient layer in which a helical pitch changes in a thickness direction, a half-width of an integral reflection spectrum of the reflective sheet is 100 nm or longer, and in a case where a wavelength on a short wavelength side that defines the half-width is represented by λα, a wavelength on a long wavelength side that defines the half-width is represented by λβ, a center wavelength that (Continued)

defines the half-width is represented by $\lambda_C$, $\lambda_1=(\lambda\alpha+\lambda_C)/2$, and $\lambda_2=(\lambda_C+\lambda\beta)/2$, the following Expressions (1) and (2) are satisfied.

$$I-R(\lambda_1) > I-R(\lambda_2) \quad \text{Expression (1)}$$

$$SCE(\lambda_1)/I-R(\lambda_1) > SCE(\lambda_2)/I-R(\lambda_2) \quad \text{Expression (2)}$$

19 Claims, 3 Drawing Sheets

(51) Int. Cl.
  *G02B 5/20* (2006.01)
  *B29K 105/00* (2006.01)
(52) U.S. Cl.
  CPC ............ *G02B 5/0284* (2013.01); *G02B 5/20* (2013.01); *B29K 2105/0079* (2013.01)

(56) References Cited

U.S. PATENT DOCUMENTS

| | | |
|---|---|---|
| 2018/0164480 A1 | 6/2018 | Yoshida |
| 2019/0033634 A1 | 1/2019 | Katoh et al. |
| 2020/0199452 A1* | 6/2020 | Nakata ................... C09K 19/54 |

FOREIGN PATENT DOCUMENTS

| | | |
|---|---|---|
| JP | 2005-345982 A | 12/2005 |
| JP | 2018-87876 A | 6/2018 |
| WO | WO 2004/063780 A1 | 7/2004 |
| WO | WO 2016/052404 A1 | 4/2016 |
| WO | WO 2016/194961 A | 12/2016 |
| WO | WO 2017/169696 A1 | 10/2017 |

OTHER PUBLICATIONS

International Search Report (PCT/ISA/210), dated Jan. 15, 2019, for International Application No. PCT/JP2018/037609, with an English translation.

* cited by examiner

REFLECTIVE SHEET, DECORATIVE SHEET, AND METHOD OF MANUFACTURING REFLECTIVE SHEET

CROSS-REFERENCE TO RELATED APPLICATIONS

This application is a Continuation of PCT International Application No. PCT/JP2018/037609 filed on Oct. 9, 2018, which claims priority under 35 U.S.C. § 119(a) to Japanese Patent Application No. 2017-197766 filed on Oct. 11, 2017. The above application is hereby expressly incorporated by reference, in its entirety, into the present application.

BACKGROUND OF THE INVENTION

1. Field of the Invention

The present invention relates to a reflective sheet including a cholesteric liquid crystal layer, a decorative sheet, and a method of manufacturing a reflective sheet.

2. Description of the Related Art

A decorative sheet having so-called metallic gloss that reflects light in a visible range is used for, for example, a surface of a molded article such as home electric appliances, business machines, or automobile components. As this decorative sheet, a resin sheet including metal particles is used in order to impart an external appearance having metallic gloss. However, a substitute is desired from the viewpoints of an environmental burden caused by the use of heavy metal or due to the risk caused by radio disturbance during the use of a communication device such as a mobile phone. On the other hand, the use of a film including a cholesteric liquid crystal layer that can impart a beautiful external appearance having high reflection brightness and spectral characteristics has been considered.

In addition, recently, an element using external light, for example, a camera or a sensor has been mounted on various devices such as a mobile personal computer, a smartphone, or a tablet. In addition, it is expected that the kind and number of devices on which the element using external light is mounted will increase due to improvement of a technique such as personal authentication or viewpoint tracking using a camera or a sensor. On the other hand, in a case where the element such as a camera mounted on the device is recognized by a user, a sense of unity of the design may deteriorate. As the decorative sheet that makes the element using external light such as a camera or a sensor inconspicuous to the user, a film including a cholesteric liquid crystal layer can be used.

It is known that a cholesteric liquid crystalline phase exhibits selective reflection having a reflection center wavelength correlating to a helical pitch of the cholesteric liquid crystalline phase. Regarding a layer (hereinafter, in this specification, also referred to as "cholesteric liquid crystal layer") obtained by immobilizing a cholesteric liquid crystalline phase, a broadband reflection film having selective reflection in a wide wavelength range can be obtained in which the wavelength range of selective reflection becomes wider than that of a layer obtained by immobilizing a cholesteric liquid crystalline phase having a uniform helical pitch using a layer (also referred to as "pitch gradient layer" or "PG layer") in which a helical pitch changes in a thickness direction of the layer.

For example, JP1994-281814A (JP-H6-281814A) discloses a cholesteric polarizer including an optically active layer that is formed of a polymer material having cholesteric regularity, in which the polymer material is aligned such that a molecular helical axis extends across the layer, and a molecular helical pitch in the above-described layer changes such that a difference between a maximum pitch and a minimum pitch is at least 100 nm.

In addition, JP3272668B describes a photopolymerized cholesteric liquid crystal having a cholesteric reflection range that is wider by at least 10 nm than that of a photopolymerized cholesteric liquid crystal manufactured by typical exposure, in which the reflection range is widened by a gradient in the helical pitch (pitch gradient).

SUMMARY OF THE INVENTION

However, the PG layer described in JP1994-281814A (JP-H6-281814A) and JP3272668B exhibits specular reflection properties, and the amount of light reflected in a specular reflection direction of illumination light increases. However, the amount of light reflected in a direction deviating from specular reflection is small.

Here, a configuration is disclosed in which, in order to increase the amount of light reflected in a direction other than specular reflection in a cholesteric liquid crystal layer, that is, to increase diffusion reflection properties of a cholesteric liquid crystal layer, a stripe pattern including bright portions and dark portions that is observed with a scanning electron microscope (SEM) in a cross-sectional of the cholesteric liquid crystal layer has a wavy structure (JP2018-087876A).

In the configuration in which the stripe pattern including bright portions and dark portions that is observed with a SEM in the cross-section of the cholesteric liquid crystal layer has the wavy structure, the helical axis of a liquid crystal compound faces various directions without being aligned in one direction. Therefore, in a case where light is incident into the cholesteric liquid crystal layer having the wavy structure, the light is reflected in various directions.

Therefore, it is considered that, by combining the wavy structure with the above-described PG layer, the amount of light reflected in a direction other than specular reflection from the PG layer having selective reflection in a wide wavelength range is increased. As a result, it is considered that light is reflected and color can be visually recognized in case of being seen from any direction.

However, according to an investigation by the present inventors, it was found that, in a case where the wavy structure is combined with the PG layer having selective reflection in a wide wavelength range, there is a problem in that the tint of light to be visually recognized varies depending on angles.

Specifically, in a case where diffusion reflection properties are imparted to the PG layer, light (short-wavelength light) reflected from a range (short wavelength side reflection range) where short-wavelength light is reflected in a selective reflection wavelength range may be incident in an oblique direction into a range (long wavelength side reflection range) where long-wavelength light is reflected in a selective reflection wavelength range. In a case where light is incident into a cholesteric liquid crystal layer from an oblique direction, in principle, the reflection wavelength of the cholesteric liquid crystal layer is shifted to a short wavelength side. In addition, the shift amount to a short wavelength side depends on the incidence angle of light. Therefore, in a case where short-wavelength light is incident into the long wavelength side reflection range from an oblique direction by diffusion reflection, the short-wavelength light is reflected from the long wavelength side reflection range at an incidence angle. That is, light that is incident from a front direction of the PG layer and is reflected from the short wavelength side reflection range in the front direction is reflected to a back surface side of the PG layer in the long wavelength side reflection range. As a result, at this angle, the amount of short-wavelength light that is reflected in the front direction decreases. Thus, a ratio between the amount of short-wavelength light and the amount of light having another wavelength is different from that in another direction. Likewise, at another angle, light having one wavelength is reflected from the long wavelength side reflection range to the back surface side of the PG layer depending on the amount of short wavelength shift, and a ratio between the amount of light having the wavelength and the amount of light having another wavelength is different from that in another direction.

Accordingly, it was found that the wavelength distribution of reflected light varies depending on angles and there is a problem in that the tint of light to be visually recognized varies depending on angles.

An object of the present invention is to provide a reflective sheet having selective reflection in a wide wavelength range and a small change in tint depending on angles at which light is visually recognized, a decorative sheet, and a method of manufacturing a reflective sheet, the reflective sheet including a pitch gradient layer in which a helical pitch changes in a thickness direction of the layer.

That is, the present inventors found that the object can be achieved with the following configurations.

[1] A reflective sheet comprising:
at least one cholesteric liquid crystal layer having wavelength selective reflection properties,
wherein at least one of the cholesteric liquid crystal layers is a pitch gradient layer in which a helical pitch changes in a thickness direction,
a half-width of an integral reflection spectrum of the reflective sheet is 100 nm or longer, and
in a case where a wavelength on a short wavelength side that defines the half-width is represented by $\lambda\alpha$, a wavelength on a long wavelength side that defines the half-width is represented by $\lambda\beta$, a center wavelength that defines the half-width is represented by $\lambda_C$, $\lambda_1=(\lambda\alpha+\lambda_C)/2$, and $\lambda_2=(\lambda_C+\lambda\beta)/2$, the following Expressions (1) and (2) are satisfied, $$I-R(\lambda_1)>I-R(\lambda_2) \quad \text{Expression (1),}$$

$$SCE(\lambda_1)/I-R(\lambda_1)>SCE(\lambda_2)/I-R(\lambda_2) \quad \text{Expression (2),}$$

where $I-R(\lambda)$ represents an integral reflectivity at a wavelength $\lambda$ nm, and
$SCE(\lambda)$ represents a SCE integral reflectivity at a wavelength $\lambda$ nm.

[2] The reflective sheet according to [1],
in which $\lambda_1$ represents a wavelength in a visible range.

[3] The reflective sheet according to [1] or [2],
in which $\lambda_1$ and $\lambda_2$ represent wavelengths in a visible range.

[4] The reflective sheet according to any one of [1] to [3],
in which the pitch gradient layer has a stripe pattern including bright portions and dark portions that is observed with a scanning electron microscope in a cross-section, the stripe pattern has a wavy structure, and an average value of inter-peak distances of the wavy structure is 0.5 μm to 50 μm, and in the integral reflection spectrum of the reflective sheet, $I-R(\lambda)$ at a wavelength $\lambda$ at which a maximum reflectivity is exhibited is two times or more $S-R(\lambda)$.

Here, $S-R(\lambda)$ represents a specular reflectivity at a wavelength $\lambda$ nm.

Here, the wavy structure refers to a structure in which at least one region M where an absolute value of an inclination angle of a continuous line of bright portions or dark portions in the stripe pattern with respect to a plane of the cholesteric liquid crystal layer is 5° or more is present, and a peak or valley having an inclination angle of 0° is specified at two points most adjacent to each other with the region M interposed between the two points.

In addition, the inter-peak distance the wavy structure is obtained by measuring a distance of the cholesteric liquid crystal layer in a plane direction regarding the peak or valley having an inclination angle of 0° at the two points most adjacent to each other with the region M interposed between the two points and obtaining an average of distance values at all thicknesses in a case where the length of the cholesteric liquid crystal layer in a major axis direction of a cross-section is 100 μm.

[5] The reflective sheet according to any one of [1] to [4],
in which in the pitch gradient layer, a pitch of a portion having a high curing rate is a long pitch and a pitch of a portion having a low curing rate is a short pitch.

[6] The reflective sheet according to any one of [1] to [5], comprising two pitch gradient layers having different senses.

[7] The reflective sheet according to any one of [1] to [6],
in which in at least one of the pitch gradient layers, an absorbance at a wavelength of 313 nm is 3.2 or higher.

[8] The reflective sheet according to any one of [1] to [7], further comprising:
a support; and
at least one pitch gradient layer in which a helical pitch on a side where the support is present is narrower than a helical pitch on a side opposite to the side where the support is present.

[9] A decorative sheet comprising:
the reflective sheet according to any one of [1] to [8]; and
a wavelength selective filter in which a transmittance at a wavelength of 400 to 630 nm is lower than 1%.

[10] A method of manufacturing a reflective sheet that is the reflective sheet according to any one of claims 1 to 8, the method comprising:
a step of forming a pitch gradient layer in which a helical pitch changes in a thickness direction using a liquid crystal composition including a chiral agent in which a helical twisting power changes with light, a polyfunctional liquid crystal compound, and a photopolymerization initiator,
in which the chiral agent has a molar absorption coefficient of 30000 or higher at a wavelength of 313 nm, and
by irradiating the liquid crystal composition with light in the step, the chiral agent is photoisomerized to induce the change of the helical pitch in the thickness direction.

[11] The method of manufacturing a reflective sheet according to [10],
in which a content of the photopolymerization initiator is 0.3 wt % or lower with respect to the polyfunctional liquid crystal compound.

[12] The method of manufacturing a reflective sheet according to [10] or [11],
in which the polyfunctional liquid crystal compound has two or more polymerizable groups and has an average molar absorption coefficient of lower than 5000 at 300 nm to 400 nm.

[13] The method of manufacturing a reflective sheet according to any one of [10] to [12], in which the chiral agent has a cinnamoyl group.

[14] The method of manufacturing a reflective sheet according to any one of [10] to [13], in which the chiral agent is a compound not having a polymerizable group.

[15] The method of manufacturing a reflective sheet according to any one of [10] to [14], in which the step includes a step of irradiating the liquid crystal composition with ultraviolet light at 100 mW/cm$^2$ or higher at a temperature of 40° C. or higher in an atmosphere having an oxygen concentration of 0.2% or lower.

[16] The method of manufacturing a reflective sheet according to any one of [10] to [15], in which in the step, the liquid crystal composition is exposed for patterning.

According to the present invention, it is possible to provide a reflective sheet having selective reflection in a wide wavelength range and a small change in tint depending on angles at which light is visually recognized, a decorative sheet, and a method of manufacturing a reflective sheet, the reflective sheet including a pitch gradient layer in which a helical pitch changes in a thickness direction of the layer.

DESCRIPTION OF THE PREFERRED EMBODIMENTS

Figure 1:
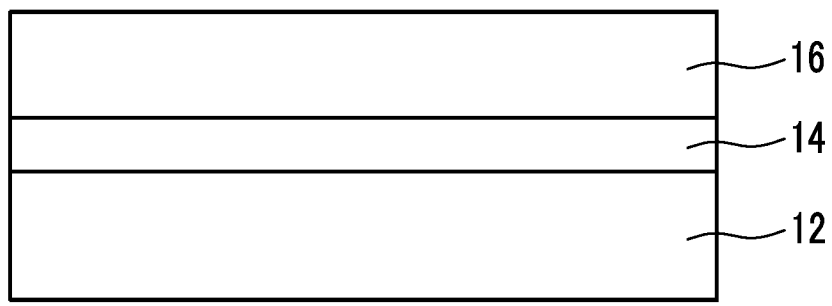
FIG. 1 is a schematic cross-sectional view showing an example of an embodiment of a reflective sheet according to the present invention.

Hereinafter, the details of the present invention will be described.

The following description regarding components has been made based on a representative embodiment of the present invention. However, the present invention is not limited to the embodiment.

In this specification, numerical ranges represented by "to" include numerical values before and after "to" as lower limit values and upper limit values.

In addition, in this specification, "parallel" or "perpendicular" does not exactly represent "parallel" or "perpendicular" and represents a range of ±5° from "parallel" or "perpendicular".

In addition, in this specification, a liquid crystal composition and a liquid crystal compound include those that do not exhibit liquid crystal properties by curing or the like.

<<Integral Reflectivity>>

In the present invention, an integral reflectivity I–R($\lambda$) at a wavelength $\lambda$ is a value measured using the following method. Using a device in which a large integrating sphere device (ILV-471, manufactured by JASCO Corporation) is attached to a spectrophotometer (V-550, manufactured by JASCO Corporation), the integral reflectivity is measured by optical trap such that light is incident from a cholesteric liquid crystal layer surface of the reflective sheet.

The integral reflectivity I–R($\lambda$) is an integral reflectivity including a specularly reflected light, that is, a specular component include (SCI) type integral reflectivity.

<<Specular Reflectivity>>

In the present invention, a specular reflectivity S–R($\lambda$) at a wavelength $\lambda$ is a value measured using the following method. Using a device in which an absolute reflectivity measurement device (ARV-474, manufactured by JASCO Corporation) is attached to a spectrophotometer (V-550, manufactured by JASCO Corporation), a specular reflectivity at an incidence angle of 5° is measured such that light is incident from the cholesteric liquid crystal layer surface of the reflective sheet.

<<SCE Integral Reflectivity>>

In the present invention, a specular component exclude (SCE) integral reflectivity SCE($\lambda$) at a wavelength $\lambda$ is calculated from the integral reflectivity and the specular reflectivity according to SCE($\lambda$)=I–R($\lambda$)–S–R($\lambda$).

<<Curing Rate>>

In the present invention, the curing rate refers to a value obtained by measuring a consumption ratio of a polymerizable functional groups using an infrared (IR) absorption spectrum and a Raman spectrum. For example, a sample is obliquely cut such that a thickness direction is exposed in a plane. An IR absorption spectrum of the formed sample piece is measured by attenuated total reflection-infrared spectroscopy (ATR-IR). The curing rate can be determined from a ratio between an absorption intensity based on a carbonyl group in the vicinity of 1720 cm$^{-1}$ and an absorption intensity based on a carbon-carbon double bond in the vicinity of 810 cm$^{-1}$ in the obtained absorption spectrum. In the present invention, in a case where the curing rate in both interfaces of the PG layer is determined, the curing rate can be obtained by measuring the IR absorption spectrum by ATR-IR regarding a region of the formed sample piece corresponding to two outermost regions among five regions that are equally divided in the thickness direction.

<<Selective Reflection Wavelength and Half-Width>>

In the present invention, a half-width and a selective reflection wavelength are values measured using the following method. In a case where the integral reflectivity is measured using the above-described method, a spectrum waveform of the integral reflectivity having a peak shape (upward protrusion shape) in which the horizontal axis represents a wavelength is obtained. At this time, an average reflectivity (arithmetic mean) of a maximum value and a minimum value of the integral reflectivity is obtained. Among two wavelengths at two intersections between the waveform and the average transmittance, in a case where a value of a wavelength on a short wavelength side is represented by $\lambda\alpha$ (nm) and a value of a wavelength on a long wavelength side is represented by $\lambda\beta$ (nm), the selective reflection wavelength is calculated from the following expression. In the present invention, the selective reflection wavelength defined by the following expression has the same definition as that of a center wavelength $\lambda_C$.

Selective Reflection Wavelength=($\lambda\alpha+\lambda\beta$)/2

Half-Width=($\lambda\beta-\lambda\alpha$)

Here, in the case of a sample having low diffusion reflection properties and strong specular reflection properties, a waveform of an integral reflection spectrum of the integral reflectivity may be scattered in a serrated shape. In this case, an average reflectivity (arithmetic mean) of a maximum value and a minimum value in a spectrum waveform of the above-described specular reflectivity is obtained. Among two wavelengths at two intersections between the waveform and the average reflectivity, in a case where a value of a wavelength on a short wavelength side is represented by λα (nm) and a value of a wavelength on a long wavelength side is represented by λβ (nm), the selective reflection wavelength is calculated from the following expression.

In another method, by measuring a transmission spectrum of a sample using Axoscan manufactured by Axometrix Inc, the reflection center wavelength and the half-width can also be measured. By measuring the transmission spectrum, a transmission spectrum waveform having a valley shape (downward protrusion shape) in which the horizontal axis represents a wavelength is obtained. At this time, an average reflectivity (arithmetic mean) of a maximum value and a minimum value of the transmittance is obtained. Among two wavelengths at two intersections between the waveform and the average transmittance, in a case where a value of a wavelength on a short wavelength side is represented by λα (nm) and a value of a wavelength on a long wavelength side is represented by λβ (nm), the selective reflection wavelength is calculated from the following expression.

<Reflective Sheet>

A reflective sheet according to an embodiment of the present invention comprises:

at least one cholesteric liquid crystal layer having wavelength selective reflection properties, in which at least one of the cholesteric liquid crystal layers is a pitch gradient layer in which a helical pitch changes in a thickness direction, a half-width of an integral reflection spectrum of the reflective sheet is 100 nm or longer, and in a case where a wavelength on a short wavelength side that defines the half-width is represented by λα, a wavelength on a long wavelength side that defines the half-width is represented by λβ, a center wavelength that defines the half-width is represented by $\lambda_C$, $\lambda_1 = (\lambda\alpha + \lambda_C)/2$, and $\lambda_2 = (\lambda_C + \lambda\beta)/2$, the following Expressions (1) and (2) are satisfied, $$I-R(\lambda_1) > I-R(\lambda_2) \qquad \text{Expression (1),}$$

$$SCE(\lambda_1)/I-R(\lambda_1) > SCE(\lambda_2)/I-R(\lambda_2) \qquad \text{Expression (2),}$$

where I–R(λ) represents an integral reflectivity at a wavelength λ nm, and

SCE(λ) represents a SCE integral reflectivity at a wavelength λ nm.

FIG. 1 is a cross-sectional view schematically showing an example of the reflective sheet according to the present invention.

A reflective sheet 10 shown in FIG. 1 includes a support 12, an undercoat layer 14, and a pitch gradient layer 16. The pitch gradient layer 16 is one cholesteric liquid crystal layer.

It is known that the cholesteric liquid crystalline phase exhibits selective reflection properties at a specific wavelength.

A center wavelength of selective reflection (selective reflection center wavelength) λ of a general cholesteric liquid crystalline phase depends on a helical pitch in the cholesteric liquid crystalline phase and complies with a relationship of λ=n×P with an average refractive index n of the cholesteric liquid crystalline phase. Therefore, the selective reflection center wavelength can be adjusted by adjusting the helical pitch.

The selective reflection center wavelength of the cholesteric liquid crystalline phase increases as the helical pitch increases.

The helical pitch refers to one pitch (period of helix) of the helical structure of the cholesteric liquid crystalline phase, in other words, one helical turn. That is, the helical pitch refers to the length in a helical axis direction in which a director (in the case of a rod-shaped liquid crystal, a major axis direction) of the liquid crystal compound constituting the cholesteric liquid crystalline phase rotates by 360°.

The helical pitch of the cholesteric liquid crystalline phase depends on the kind of the chiral agent used together with the liquid crystal compound and the concentration of the chiral agent added during the formation of the cholesteric liquid crystal layer. Therefore, a desired helical pitch can be obtained by adjusting these conditions.

In addition, the cholesteric liquid crystalline phase exhibits selective reflection properties with respect to left or circularly polarized light at a specific wavelength. Whether or not the reflected light is right circularly polarized light or left circularly polarized light is determined depending on a helical twisting direction (sense) of the cholesteric liquid crystalline phase. Regarding the selective reflection of the circularly polarized light by the cholesteric liquid crystalline phase, in a case where the helical twisting direction of the cholesteric liquid crystal layer is right, right circularly polarized light is reflected, and in a case where the helical twisting direction of the cholesteric liquid crystal layer is left, left circularly polarized light is reflected.

A direction of rotation of the cholesteric liquid crystalline phase can be adjusted by adjusting the kind of the liquid crystal compound that forms the cholesteric liquid crystal layer and/or the kind of the chiral agent to be added.

The pitch gradient layer 16 is a cholesteric liquid crystal layer having wavelength selective reflection properties that is a layer in which a helical pitch changes in the thickness direction.

Figure 2:
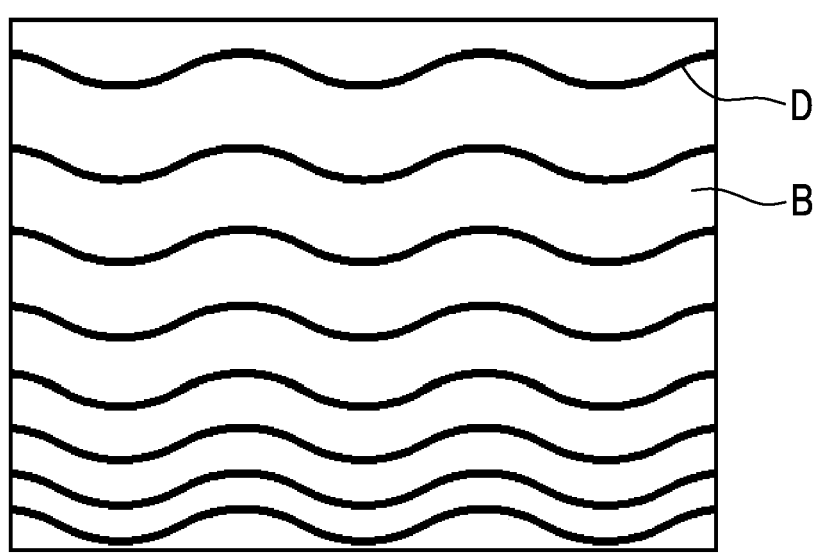
FIG. 2 is a schematic cross-sectional view showing a structure of one example of a pitch gradient layer.

FIG. 2 is a diagram schematically showing an example of a stripe pattern including bright portions B and dark portions D that can be seen when a cross-section of the pitch gradient layer 16 is observed with a scanning electron microscope (SEM). In addition, FIG. 5 shows a reference Example of the SEM image of the cross-section of the cholesteric liquid crystal layer.

Figure 5:
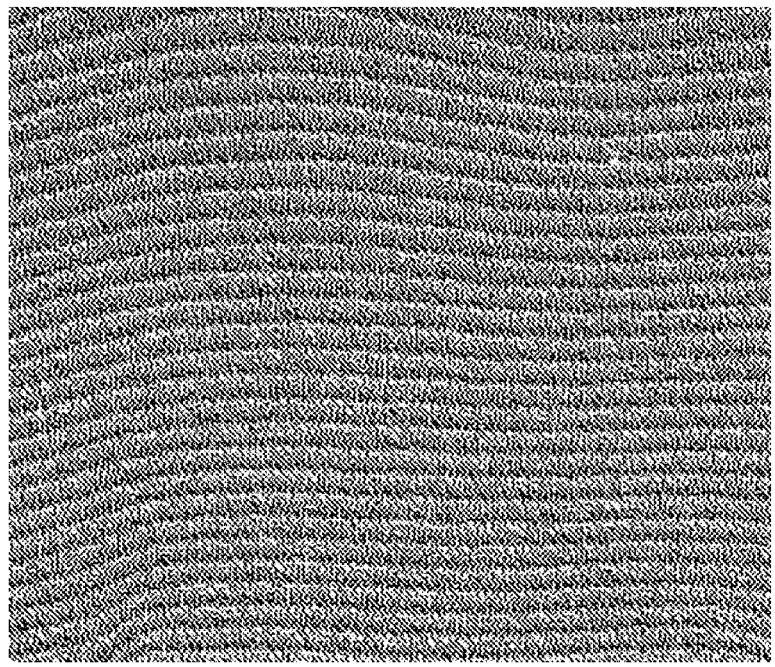
FIG. 5 is a scanning electron microscope image showing a cross-section of one example of a cholesteric liquid crystal layer for reference.

As shown in FIGS. 2 and 5, typically, the stripe pattern including the bright portions B and the dark portions D are observed in the cross-section of the cholesteric liquid crystal layer (the pitch gradient layer 16). That is, in the cross-section of the cholesteric liquid crystal layer, a layered structure in which the bright portions B and the dark portions D are alternately laminated is observed.

In the pitch gradient layer 16, the helical pitch changes in the thickness direction of the layer. Therefore, the wavelength range of selective reflection is wider than that of a layer obtained by immobilizing a cholesteric liquid crystalline phase having a uniform helical pitch, and selective reflection is exhibited in a wide wavelength range.

In the SEM cross-section shown in FIG. 2, the bright portions B and the dark portions D are observed in a case where the liquid crystal compound in the cholesteric liquid crystalline phase is helically aligned and the direction of the liquid crystal compound varies depending on positions in the thickness direction. Accordingly, in the SEM cross-section of the pitch gradient layer 16 in which the helical pitch changes in the thickness direction (up-down direction in FIG. 2), as shown in FIG. 2, intervals between the bright portions B and the dark portions D in the thickness direction are different from each other. In the example shown in FIG. 2, the intervals between bright portions B and the dark portions D become narrower from the upper side toward the lower side in the drawing in the thickness direction. That is, the helical pitch changes to become narrower from the upper side toward the lower side in the drawing in the thickness direction.

In order to form the pitch gradient layer, the chiral agent in which back isomerization, dimerization, or isomerization and dimerization or the like occurs during light irradiation such that the helical twisting power (HTP) changes is used. By irradiating the liquid crystal composition with light having a wavelength at the HTP of the chiral agent changes before or during the curing of the liquid crystal composition for forming the cholesteric liquid crystal layer, the pitch gradient layer can be formed.

For example, by using a chiral agent in which the HTP decreases during light irradiation, the HTP of the chiral agent decreases during light irradiation.

Here, the irradiated light is absorbed by a material for forming the pitch gradient layer. Accordingly, for example, in a case where the light is irradiated from the upper side, the irradiation dose of the light gradually decreases from the upper side to the lower side. That is, the amount of decrease in the HTP of the chiral agent gradually decreases from the upper side to the lower side. Therefore, on the upper side where the decrease in HTP is large, the induction of helix is small, and thus the helical pitch is long. On the lower side where the decrease in HTP is small, helix is induced by the original HTP of the chiral agent, and thus the helical pitch decreases.

That is, in this case, in the pitch gradient layer, long-wavelength light is selectively reflected from the upper side, and short-wavelength light is selectively reflected from the lower side. Accordingly, by using the pitch gradient layer in which the helical pitch changes in the thickness direction, light in a wide wavelength range can be selectively reflected.

Further, in the present invention, in the cross-section of the pitch gradient layer 16 observed with an SEM, as shown in FIG. 2, the bright portions B and the dark portions D have a wavy structure in which at least a part thereof forms periodical wavy unevenness in a plane direction.

That is, in the present invention, the pitch gradient layer has a cholesteric liquid crystal structure in which an angle between the helical axis and the surface of the pitch gradient layer periodically changes. In other words, the pitch gradient layer has a cholesteric liquid crystal structure, the cholesteric liquid crystal structure provides a stripe pattern including the bright portions B and the dark portions D in a cross-sectional view that is observed with a SEM, and an angle between a normal line of a line formed by a dark portion and the surface of the pitch gradient layer periodically changes.

It is preferable that the wavy structure is a structure in which at least one region M where an absolute value of an inclination angle of a continuous line of the bright portions B or the dark portions D that form the stripe pattern with respect to a plane of the cholesteric liquid crystal layer (pitch gradient layer) is 5° or more is present, and a peak or valley having an inclination angle of 0° is specified at two points most adjacent to each other with the region M interposed therebetween in a plane direction.

The peak or valley having an inclination angle of 0° may have a protrusion shape or a recessed shape. However, the peak or valley may be a point having a stepwise shape or a rack shape as long as it has an inclination angle of 0°. In the wavy structure, it is preferable that the region M in which an absolute value of an inclination angle of a continuous line of the bright portions B or the dark portions D in the stripe pattern is 5° or more and the peak or valley in which the region M is interposed are repeated multiple times.

In the configuration where the bright portions B and the dark portions D in a cross-sectional view observed with a SEM have the wavy structure (uneven structure, undulated structure), there is a region where the helical axis of the liquid crystal compound for forming the cholesteric liquid crystalline phase is inclined. Therefore, in a case where the light is incident in the normal direction of the pitch gradient layer 16, a part of the incidence light is reflected in an oblique direction.

That is, by allowing the bright portions B and the dark portions D to have the wavy structure, the pitch gradient layer 16 having appropriate diffusion reflection properties can be obtained.

In the present invention, this way, in the pitch gradient layer in which the helical pitch changes in the thickness direction, the bright portions B and the dark portions D in a cross-sectional view observed with a SEM have the wavy structure. As a result, the following Expression (2) is satisfied.

$$SCE(\lambda_1)/I-R(\lambda_1) > SCE(\lambda_2)/I-R(\lambda_2) \qquad \text{Expression (2)}$$

Expression (2) represents that a ratio of the amount of a diffusion reflection component to the amount of reflected light at a wavelength $\lambda_1$ is higher than a ratio of the amount of a diffusion reflection component to the amount of reflected light at a wavelength $\lambda_2$. That is, the amount of the diffusion reflection component in the reflected light at $\lambda_1$ on the short wavelength side is more than the amount of the diffusion reflection component in the reflected light at $\lambda_2$ on the long wavelength side.

$SCE(\lambda)$ represents a SCE integral reflectivity at a wavelength $\lambda$ nm, and $I-R(\lambda)$ represents an integral reflectivity at a wavelength $\lambda$ nm.

The methods of measuring the SCE integral reflectivity ($SCE(\lambda)$) and the integral reflectivity ($I-R(\lambda)$) are as described above.

In addition, in the present invention, by controlling the change of the helical pitch in the thickness direction in the pitch gradient layer, the following Expression (1) is satisfied.

$$I-R(\lambda_1) > I-R(\lambda_2) \qquad \text{Expression (1)}$$

Expression (1) represents that the reflectivity at $\lambda_1$ on the short wavelength side is higher than the reflectivity at $\lambda_2$ on the long wavelength side.

Here, $\lambda_1$ and $\lambda_2$ will be described using FIG. 3.

Figure 3:
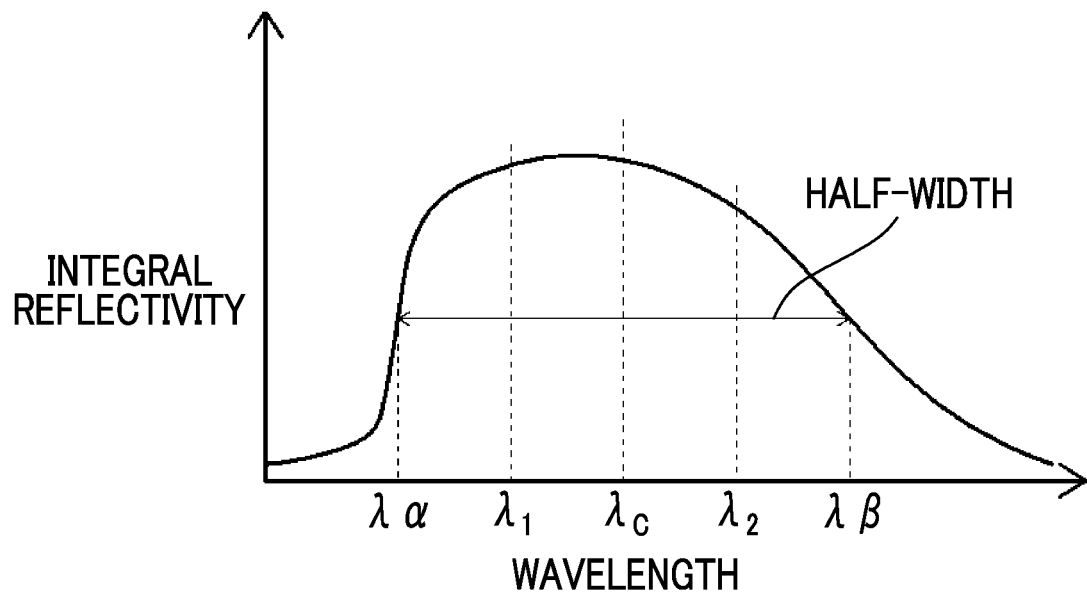
FIG. 3 is a schematic graph showing $\lambda_1$ and $\lambda_2$.

FIG. 3 is a graph schematically showing a relationship between a wavelength and an integral reflectivity.

In this case, an average reflectivity (arithmetic mean) of a maximum value and a minimum value of the integral reflectivity in a spectrum waveform of the integral reflectivity is obtained, and the wavelength $\lambda\alpha$ (nm) on the short wavelength side that defines half-width and the wavelength $\lambda\beta$ (nm) on the long wavelength side that defines half-width are defined from two intersections between the waveform and the average reflectivity. In addition, this one wavelength difference $\lambda\beta-\lambda\alpha$ is the half-width. In addition, in a case where the center wavelength in the wavelength range of the half-width is represented by $\lambda_C(=(\lambda\alpha+\lambda\beta)/2)$, $\lambda_1$ and $\lambda_2$ represent a center wavelength between $\lambda\alpha$ and $\lambda_C$ and a center wavelength between $\lambda\beta$ and $\lambda_C$, respectively. That is, $\lambda_1$ and $\lambda_2$ are defined by $\lambda_1=(\lambda\alpha+\lambda_C)/2$ and $\lambda_2=(\lambda_C+\lambda\beta)/2$, respectively.

As described above, in a reflective sheet that is used as a decorative sheet or the like, the use of a cholesteric liquid crystal layer can be considered. It is known that a cholesteric liquid crystal layer exhibits selective reflection having a reflection center wavelength correlating to a helical pitch of the cholesteric liquid crystalline phase. Typically, this cholesteric liquid crystal layer has a narrow wavelength range that exhibits selective reflection and cannot reflect light other than light in a specific wavelength range. Therefore, a cholesteric liquid crystal layer that can reflect light in a wide wavelength range is desired. On the other hand, in order to realize a broadband reflection film that exhibits selective reflection in a wide wavelength range, a layer (pitch gradient layer) in which a helical pitch of a cholesteric liquid crystal layer changes in a thickness direction is disclosed.

On the other hand, typically, a cholesteric liquid crystal layer exhibits specular reflection properties due to its structure, and the amount of light reflected in a specular reflection direction of illumination light increases. However, the amount of light reflected in a direction deviating from specular reflection is small. Therefore, a configuration is disclosed in which, in order to increase the amount of light reflected in a direction other than specular reflection in a cholesteric liquid crystal layer, that is, to increase diffusion reflection properties of a cholesteric liquid crystal layer, a stripe pattern including bright portions and dark portions that is observed with a SEM in a cross-sectional of the cholesteric liquid crystal layer has a wavy structure.

Therefore, it is considered that, by combining the wavy structure with the above-described pitch gradient layer, the amount of light reflected in a direction other than specular reflection from the pitch gradient layer having selective reflection in a wide wavelength range is increased. As a result, it is considered that light is reflected and color can be visually recognized in case of being seen from any direction.

However, according to an investigation by the present inventors, it was found that, in a case where the wavy structure is combined with the pitch gradient layer having selective reflection in a wide wavelength range, there is a problem in that the tint of light to be visually recognized varies depending on angles.

Figure 4:
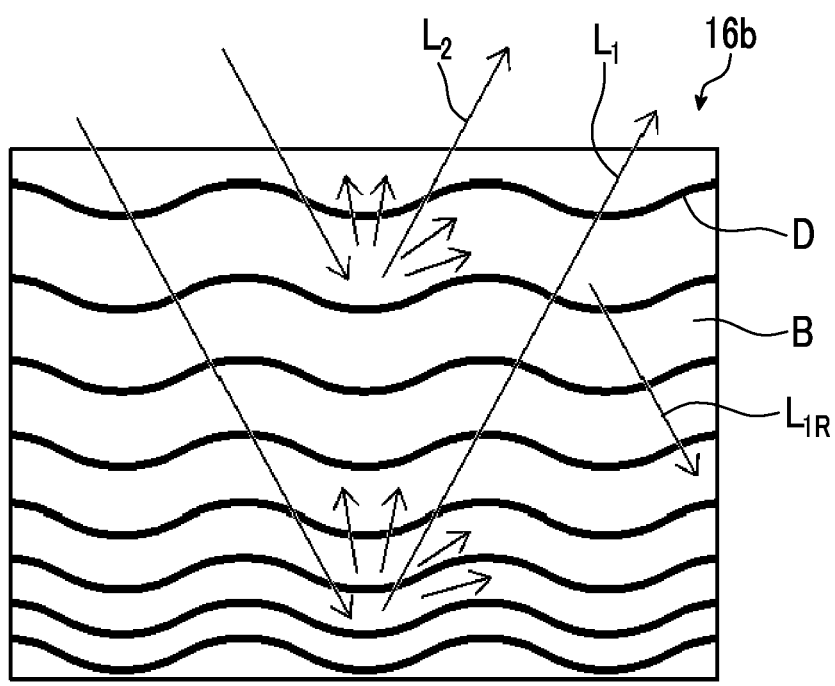
FIG. 4 is a schematic cross-sectional view showing the action of the reflective sheet according to the present invention.

The detailed description will be described using a schematic diagram of FIG. 4. In a case where diffusion reflection properties are imparted to the pitch gradient layer, light (hereinafter, also referred to as "short-wavelength light"; represented by $L_1$ in FIG. 4) reflected from a range (hereinafter, also referred to as "short wavelength side reflection range"; in FIG. 4, a lower range of the pitch gradient layer) where short-wavelength light is reflected in a selective reflection wavelength range may be incident in an oblique direction into a range (hereinafter, also referred to as long wavelength side reflection range; an upper range of the pitch gradient layer in FIG. 4) where long-wavelength light (represented by $L_2$ in FIG. 4) is reflected in a selective reflection wavelength range. In a case where light is incident into a cholesteric liquid crystal layer from an oblique direction, in principle, the reflection wavelength of the cholesteric liquid crystal layer is shifted to a short wavelength side. In addition, the shift amount to a short wavelength side depends on the incidence angle of light. Therefore, in a case where short-wavelength light is incident into the long wavelength side reflection range from an oblique direction by diffusion reflection, as shown in FIG. 4, the short-wavelength light $L_1$ is reflected from the long wavelength side reflection range at an incidence angle (represented by $L_{1R}$ in FIG. 4). That is, light $L_1$ that is incident from a front direction of the pitch gradient layer and is reflected from the short wavelength side reflection range in the front direction is reflected to a back surface side of the pitch gradient layer in the long wavelength side reflection range ($L_{1R}$). As a result, at this angle, the amount of short-wavelength light $L_1$ that is reflected in the front direction decreases. Thus, a ratio between the amount of short-wavelength light and the amount of light having another wavelength (for example, $L_2$) is different from that in another direction. Likewise, at another angle, light having one wavelength is reflected from the long wavelength side reflection range to the back surface side of the pitch gradient layer depending on the amount of short wavelength shift, and a ratio between the amount of light having the wavelength and the amount of light having another wavelength is different from that in another direction.

Accordingly, it was found that the wavelength distribution of reflected light varies depending on angles and there is a problem in that the tint of light to be visually recognized varies depending on angles.

On the other hand, the reflective sheet according to the embodiment of the present invention comprises a pitch gradient layer in which a helical pitch changes in a thickness direction, in which a half-width of an integral reflection spectrum of the reflective sheet is 100 nm or longer, and in a case where a wavelength on a short wavelength side that defines the half-width is represented by $\lambda\alpha$, a wavelength on a long wavelength side that defines the half-width is represented by $\lambda\beta$, a center wavelength that defines the half-width is represented by $\lambda_C$, $\lambda_1=(\lambda\alpha+\lambda_C)/2$, and $\lambda_2=(\lambda_C+\lambda\beta)/2$, $\lambda_1$ and $\lambda_2$ satisfy the following Expressions (1) and (2).

$$I-R(\lambda_1)>I-R(\lambda_2) \quad \text{Expression (1)},$$

$$SCE(\lambda_1)/I-R(\lambda_1)>SCE(\lambda_2)/I-R(\lambda_2) \quad \text{Expression (2)},$$

That is, in the reflective sheet according to the embodiment of the present invention, the amount of the diffusion reflection component on the short wavelength ($\lambda_1$) side is more than that on the long wavelength ($\lambda_2$) side in the reflected light, and the reflectivity of the short wavelength ($\lambda_1$) side is higher than that of the long wavelength ($\lambda_2$) side. With this configuration, even in a case where a part of short-wavelength light reflected from the short wavelength side reflection range is reflected (light $L_{1R}$) from the long wavelength side reflection range, a ratio between the amount of light $L_1$ and the amount of the long-wavelength light $L_2$ that is reflected from the long wavelength side reflection range can be appropriately adjusted. Accordingly, in the pitch gradient layer having selective reflection in a wide wavelength range, the change of the tint of light to be visually recognized depending on angles can be reduced.

Here, from the viewpoint of suppressing the tint change, the ratio $I-R(\lambda_1)/I-R(\lambda_2)$ between $I-R(\lambda_1)$ and $I-R(\lambda_2)$ is preferably 1.001 to 3.0, more preferably 1.002 to 2.0, and still more preferably 1.005 to 1.5.

In addition, from the viewpoint of suppressing the tint change, the ratio $(SCE(\lambda_1)/I-R(\lambda_1))/(SCE(\lambda_2)/I-R(\lambda_2))$ between $SCE(\lambda_1)/I-R(\lambda_1)$ and $(SCE(\lambda_2)/I-R(\lambda_2))$ is preferably 1.001 to 3.0, more preferably 1.002 to 2.0, and still more preferably 1.005 to 1.5.

In addition, for example, from the viewpoint of increasing the range of selective reflection and suppressing the tint change, the half-width of the integral reflection spectrum of the reflective sheet is preferably 100 nm to 500 nm, more preferably 110 nm to 450 nm, and still more preferably 130 nm to 400 nm.

In addition, for a decorative use, $\lambda_1$ is preferably a wavelength in a visible range, and $\lambda_2$ is preferably a wavelength in a visible range.

Here, the reflective sheet 10 according to the embodiment of the present invention may include a plurality of pitch gradient layers having different peak wavelengths of characteristic reflection in a plane of the sheet. In addition, the reflective sheet 10 according to the embodiment of the present invention may include a region where a plurality of pitch gradient layers having different peak wavelengths of characteristic reflection are laminated. Examples of a method of realizing the configuration include a method of transferring and laminating a plurality of optical films having different reflection wavelengths and a method of drawing a plurality of pitch gradient layers having different amounts of the chiral agent in a plane of the sheet by ink jet. However, the present invention is not limited to these examples.

In addition, the reflective sheet 10 according to the embodiment of the present invention only have to include at least one pitch gradient layer and may include a typical cholesteric liquid crystal layer other than the pitch gradient layer, that is, one or more cholesteric liquid crystal layers in which the helical pitch is fixed in the thickness direction.

Here, as shown in FIG. 1, the reflective sheet 10 may include the support 12. At this time, the pitch gradient layer 16 may have a configuration in which a helical pitch on a side where the support is present is narrower than a helical pitch on a side opposite to the side where the support is present, that is, a configuration in which the support 12 is provided below the pitch gradient layer in FIG. 2. Alternatively, the pitch gradient layer 16 may have a configuration in which a helical pitch on a side where the support is present is wider than a helical pitch on a side opposite to the side where the support is present, that is, a configuration in which the support 12 is provided above the pitch gradient layer in FIG. 2.

In addition, examples of a preferable aspect of the pitch gradient layer include an aspect in which a chiral agent in which HTP changes during light irradiation is used. By using the chiral agent in which HTP changes during light irradiation and irradiating the liquid crystal composition with light having a wavelength that is absorbed by the chiral agent, the irradiation dose of light that reaches the thickness direction, that is, the change of HTP can be changed, and the pitch gradient layer having selective reflection in a wide wavelength range can be formed. As the chiral agent, a well-known compound can be used. However, it is preferable that the chiral agent has a cinnamoyl group, and it is preferable that, in at least one of the pitch gradient layers, an absorbance at a wavelength of 313 nm is 3.2 or higher.

In addition, it is preferable that, in the pitch gradient layer to be formed, a pitch having a high curing rate of the liquid crystal composition is a long pitch and a pitch having a low curing rate of the liquid crystal composition is a short pitch.

[Pitch Gradient Layer (Cholesteric Liquid Crystal Layer)]

It is preferable that, in the pitch gradient layer (cholesteric liquid crystal layer) used in the embodiment of the present invention, the liquid crystal compound is immobilized in a cholesterically aligned state. The cholesterically aligned state may be an aligned state where right circularly polarized light is reflected or an aligned state where left circularly polarized light is reflected.

The details of the cholesteric liquid crystal layer and a functional layer including a plurality of cholesteric liquid crystal layers can be found in the description of a cholesteric liquid crystal layer and a reflecting layer in WO2016/052367.

In addition, the reflective sheet according to the embodiment of the present invention may include a single cholesteric liquid crystal layer or may include a plurality of cholesteric liquid crystal layers. In a case where the reflective sheet according to the embodiment of the present invention includes a plurality of cholesteric liquid crystal layers, it is preferable that the cholesteric liquid crystal layers have different senses (helical turning directions). For example, the reflective sheet according to the embodiment of the present invention may include two pitch gradient layers having different senses.

The pitch of the cholesteric liquid crystalline phase depends on the kind of the chiral agent which is used in combination of the polymerizable liquid crystal compound, or the concentration of the chiral agent added. Therefore, a desired pitch can be obtained by adjusting the kind and concentration of the chiral agent. As a method of measuring a helical sense or pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used.

In addition, in a case where a cross-section of the cholesteric liquid crystal layer used in the present invention is observed using a scanning electron microscope (SEM), it is preferable that the cross-section has a stripe pattern including bright portions and dark portions.

It is preferable that the stripe pattern has a wavy structure, and an average value of inter-peak distances in the wavy structure is preferably 0.5 μm to 50 μm, more preferably 1.5 μm to 10 μm, and still more preferably 2.5 μm to 5.0 μm.

As described above, in the present invention, the wavy structure refers to a structure in which at least one region M where an absolute value of an inclination angle of a continuous line of bright portions or dark portions in the stripe pattern with respect to a plane of the cholesteric liquid crystal layer is 5° or more is present, and a peak or valley having an inclination angle of 0° is specified at two points most adjacent to each other with the region M interposed therebetween.

In addition, as described above, the peak or valley having an inclination angle of 0° may have a protrusion shape or a recessed shape. However, the peak or valley may be a point having a stepwise shape or a rack shape as long as it has an inclination angle of 0°. In the wavy structure, it is preferable that the region M in which an absolute value of an inclination angle of a continuous line of bright portions or dark portions in the stripe pattern is 5° or more and the peak or valley in which the region M is interposed are repeated multiple times.

In addition, the inter-peak distance of the wavy structure is obtained by measuring the distance of the cholesteric liquid crystal layer in a plane direction regarding the peak or valley having an inclination angle of 0° at the two points most adjacent to each other with the region M interposed therebetween and obtaining the average of distance values at all the thicknesses in a case where the length of the cholesteric liquid crystal layer in a major axis direction of a cross-section is 100 μm.

Here, in a case where each of continuous lines is in contact with any one of interfaces of a film and is interrupted, opposite ends of the interrupted portion are not considered as a peak or valley. In addition, in a case where each of continuous lines has a bent structure, the continuous line is considered to be interrupted, and opposite ends of the interrupted portion are not considered as a peak or valley.

In addition, it is preferable that I-R(λ) of the pitch gradient layer used in the present invention is two times or more S-R(λ).

Here, I-R(λ) represents an integral reflectivity at a wavelength λ nm.

Here, S-R(λ) represents a specular reflectivity at a wavelength λ nm.

With the above-described values, even in a case where the reflective sheet is observed in a direction deviating from specular reflection, sufficient brilliance can be obtained.

(Polyfunctional Liquid Crystal Compound)

It is preferable that the liquid crystal compound used in the present invention is a polyfunctional liquid crystal compound (liquid crystal compound having two or more polymerizable groups). It is preferable that the polyfunctional liquid crystal compound has two or more polymerizable groups and has an average molar absorption coefficient of lower than 5000 at 300 nm to 400 nm. The polyfunctional liquid crystal compound may be a rod-shaped liquid crystal compound or a disk-shaped liquid crystal compound and is preferably a rod-shaped liquid crystal compound.

Examples of the rod-shaped polyfunctional liquid crystal compound for forming a cholesteric liquid crystal structure include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polyfunctional liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polyfunctional liquid crystal compound is preferably 2 to 6 and more preferably 2 to 3 in one molecule. Examples of the polyfunctional liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-016616A (JP-H6-016616A), JP1995-110469A (JP-H7-110469A), JP1999-080081A (JP-H11-080081A), JP2001-328973A, WO2016/194327, and WO2016/052367. Two or more polyfunctional liquid crystal compounds may be used in combination. In a case where two or more polyfunctional liquid crystal compounds are used in combination, there may be a case where the alignment temperature can be decreased.

In addition, in the liquid crystal composition in which the liquid crystal compound, the chiral agent and the like are adjusted to form the pitch gradient layer, the addition amount of the polyfunctional liquid crystal compound in the liquid crystal composition is preferably 80% to 99.9 mass %, more preferably 85% to 99.5 mass %, and still more preferably 90% to 99 mass % with respect to the solid content mass (mass excluding a solvent) of the liquid crystal composition.

(Chiral Agent: Optically Active Compound)

It is preferable that the chiral agent used in the present invention has a molar absorption coefficient of 30000 or higher at a wavelength of 313 nm. The chiral agent has a function of causing a helical structure of a cholesteric liquid crystalline phase to be formed. The chiral agent may be selected depending on the purpose because a helical sense or a helical pitch induced from the compound varies.

As the chiral agent, a well-known compound can be used, but a compound having a cinnamoyl group is preferable. In addition, it is preferable that the chiral agent is a compound not having a polymerizable group. Examples of the chiral agent include compounds described in Liquid Crystal Device Handbook (No. 142 Committee of Japan Society for the Promotion of Science, 1989), Chapter 3, Article 4-3, chiral agent for TN or STN, p. 199), JP2003-287623A, JP2002-302487A, JP2002-080478A, JP2002-080851A, JP2010-181852A, and JP2014-034581A.

In general, the chiral agent includes an asymmetric carbon atom. However, an axially asymmetric compound or a surface asymmetric compound not having an asymmetric carbon atom can be used as the chiral agent. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

As the chiral agent, an isosorbide derivative, an isomannide derivative, or a binaphthyl derivative can be preferably used. As the isosorbide derivative, a commercially available product such as LC-756 (manufactured by BASF SE) may be used.

The content of the chiral agent in the liquid crystal composition is preferably 0.01 mol % to 200 mol % and more preferably 1 mol % to 30 mol % with respect to the content of the liquid crystal compound.

Here, it is preferable that the chiral agent used in the present invention is a chiral agent in which the helical twisting power (HTP) changes during light irradiation to form the pitch gradient layer in which the helical pitch changes in the thickness direction.

(Polymerization Initiator)

It is preferable that the liquid crystal composition includes a polymerization initiator. In a configuration where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), an acylphosphine oxide compound (described in JP1988-040799B (JP-S63-040799B), JP1993-29234B (JP-H5-29234B), JP1998-095788A (JP-H10-095788A), JP1998-029997A (JP-H10-029997A), JP2001-233842A, JP2000-080068A, JP2006-342166A, JP2013-114249A, JP2014-137466A, JP4223071B, JP2010-262028A, and JP2014-500852A), an oxime compound (described in JP2000-066385A and Japanese Patent No. 4454067), and an oxadiazole compound (described in U.S. Pat. No. 4,212,970A). For example, the description of paragraphs 0500 to 0547 of JP2012-208494A can also be referred to.

As the polymerization initiator, an acylphosphine oxide compound or an oxime compound can also be used.

As the acylphosphine oxide compound, for example, IRGACURE 810 (manufactured by BASF Japan Ltd. compound name: bis(2,4,6-trimethylbenzoyl)-phenylphosphine oxide) as a commercially available product can be used. As the oxime compound, for example, a commercially available product such as IRGACURE OXE01 (manufactured by BASF SE), IRGACURE OXE02 (manufactured by BASF SE), TR-PBG-304 (manufactured by Changzhou Tronly New Electronic Materials Co., Ltd.), ADEKA ARKLS NCI-831 (manufactured by Adeka Corporation), ADEKA ARKLS NCI-930 (manufactured by Adeka Corporation) can be used.

As the polymerization initiator, one kind may be used alone, or two or more kinds may be used in combination.

In a case where light irradiation for curing the pitch gradient layer is performed to form the pitch gradient layer after performing light irradiation for changing the HTP of the chiral agent, it is preferable to use a photopolymerization initiator that inhibits polymerization during the light irradiation for changing the HTP of the chiral agent. In this case, the content of the photopolymerization initiator in the liquid crystal composition is preferably 0.05% to 3 mass % and more preferably 0.3% to 1.5 mass % with respect to the content of the liquid crystal compound. In addition, the light irradiation for changing the HTP of the chiral agent and the light irradiation for curing the pitch gradient layer are performed at the same time, the content of the photopolymerization initiator in the liquid crystal composition is preferably 0.01 mass % to 0.30 mass % and more preferably 0.01 mass % to 0.20 mass % with respect to the content of the liquid crystal compound.

(Crosslinking Agent)

In order to improve the film hardness after curing and to improve durability, the liquid crystal composition may optionally include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris[3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. As the crosslinking agent, one kind may be used alone, or two or more kinds may be used in combination.

The content of the crosslinking agent is preferably 3 mass % to 20 mass % and more preferably 5 mass % to 15 mass % with respect to the content of the liquid crystal compound. By adjusting the content of the crosslinking agent to be 3 mass % or higher, the effect of improving the crosslinking density can be obtained. By adjusting the content of the crosslinking agent to be 20 mass % or lower, a decrease in the stability of the cholesteric liquid crystal structure can be prevented.

(Alignment Controller)

An alignment controller contributing to the stable or rapid formation of a cholesteric liquid crystal structure with planar alignment may be added to the liquid crystal composition. Examples of the alignment controller include fluorine (meth)acrylate polymers described in paragraphs [0018] to [0043] of JP2007-272185A, and compounds represented by Formulae (I) to (IV) described in paragraphs [0031] to [0034] of JP2012-203237A.

As an alignment controller, one kind may be used alone, or two or more kinds may be used in combination.

The addition amount of the alignment controller in the liquid crystal composition is preferably 0.01 mass % to 10 mass %, more preferably 0.01 mass % to 5 mass %, and still more preferably 0.02 mass % to 1 mass % with respect to the total mass of the liquid crystal compound.

(Surfactant)

The liquid crystal composition may include a surfactant. It is preferable that the surfactant is a compound which can function as an alignment controller contributing to the stable or rapid formation of a cholesteric structure with planar alignment. Examples of the surfactant include a silicone surfactant and a fluorine surfactant. Among these, a fluorine surfactant is preferable.

Specific examples of the surfactant include compounds described in paragraphs [0082 to [0090] of JP2014-119605A, compounds described in paragraphs [0031] to [0034] of JP2012-203237A, exemplary compounds described in paragraphs [0092] and [0093] of JP2005-099248A, exemplary compounds described in paragraphs [0076] to [0078] and [0082] to [0085] of JP2002-129162A, and fluorine (meth)acrylate polymers described in paragraphs [0018] to [0043] of JP2007-272185A.

As a horizontal alignment agent, one kind may be used alone, or two or more kinds may be used in combination.

As the fluorine surfactant, a compound represented by the following Formula (I) described in paragraphs [0082] to [0090] of JP2014-119605A is more preferable.

$$(Hb^{11}\text{-}Sp^{11}\text{-}L^{11}\text{-}Sp^{12}\text{-}L^{12})_{m11}\text{-}A^{11}\text{-}L^{13}\text{-}T^{11}\text{-}L^{14}\text{-}A^{12}\text{-}(L^{15}\text{-}Sp^{13}\text{-}L^{16}\text{-}Sp^{14}\text{-}Hb^{11})_{n11}$$ 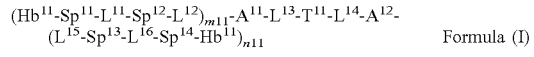

In Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (in Formula (I), R represents a hydrogen atom or an alkyl group having 1 to 6 carbon atoms). —NRCO— or —CONR— has an effect of reducing solubility and is likely to increase haze during the preparation of dots. Therefore, —O—, —S—, —CO—, —COO—, —OCO—, —COS— or —SCO— is preferable, and from the viewpoint of the stability of the compound, —O—, —CO—, —COO—, or —OCO— is more preferable. An alkyl group represented by R may be linear or branched. An alkyl group having 1 to 3 carbon atoms is more preferable, and examples thereof include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, more preferably a single bond or an alkylene group having 1 to 7 carbon atoms, and still more preferably a single bond or an alkylene group having 1 to 4 carbon atoms. However, a hydrogen atom in the alkylene group may be substituted with a fluorine atom. The alkylene group may have a branch or not, and a linear alkylene group having no branch is preferable. From the viewpoint of synthesis, it is preferable that $Sp^{11}$ and $Sp^{14}$ are the same and $Sp^{12}$ and $Sp^{13}$ are the same.

$A^{11}$ and $A^{12}$ represent a monovalent to tetravalent aromatic hydrocarbon group. The number of carbon atoms in the aromatic hydrocarbon group is preferably 6 to 22, more preferably 6 to 14, still more preferably 6 to 10, and still more preferably 6. The aromatic hydrocarbon group represented by $A^{11}$ and $A^{12}$ may have a substituent. Examples of the substituent include an alkyl group having 1 to 8 carbon atoms, an alkoxy group, a halogen atom, a cyano group, and an ester group. The description and preferable ranges of the groups can be found in the corresponding description of $T^{11}$ described below. Examples of a substituent with which the aromatic hydrocarbon group represented by $A^{11}$ or $A^{12}$ is substituted include a methyl group, an ethyl group, a methoxy group, an ethoxy group, a bromine atom, a chlorine atom, and a cyano group. A molecule including a large amount of a perfluoroalkyl portion can cause liquid crystal to be aligned even in a small addition amount, which leads to reduction in haze. Therefore, in order for the molecule to include many perfluoroalkyl groups, it is preferable that $A^{11}$ and $A^{12}$ are tetravalent. From the viewpoint of synthesis, it is preferable that $A^{11}$ and $A^{12}$ are the same.

$T^{11}$ represents a divalent group or a divalent aromatic heterocyclic group preferably represented by any one of the following formulae (X in $T^{11}$ represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms).

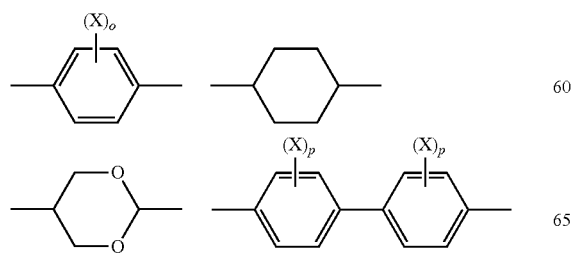

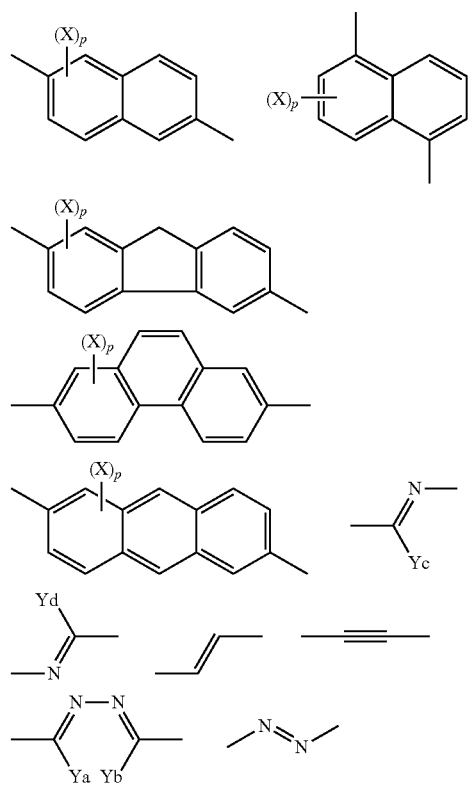

In particular, a more preferable group is as follows.

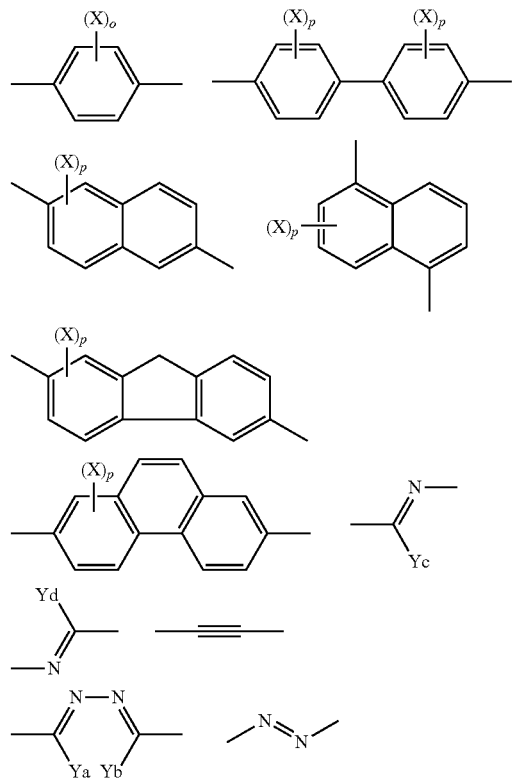

The following group is still more preferable.

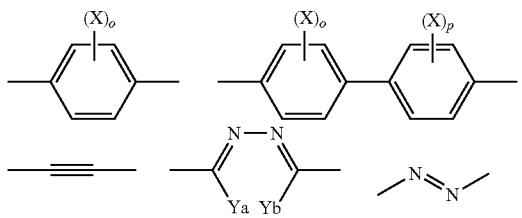

The following group is most preferable.

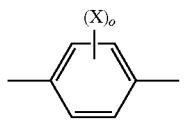

The number of carbon atoms in the alkyl group represented by X in $T^{11}$ is 1 to 8, preferably 1 to 5, and more preferably 1 to 3. The alkyl group may be linear, branched, or cyclic and is preferably linear or branched. Preferable examples of the alkyl group include a methyl group, an ethyl group, an n-propyl group, and an isopropyl group. Among these, a methyl group is preferable.

The details of an alkyl portion of the alkoxy group represented by X in $T^{11}$ can be found in the description and preferable range of the alkyl group represented by X in $T^{11}$. Examples of the halogen atom represented by X in $T^{11}$ include a fluorine atom, a chlorine atom, a bromine atom, and an iodine atom. Among these, a chlorine atom or a bromine atom is preferable. Examples of the ester group represented by X in $T^{11}$ include a group represented by $R^a COO-$. $R^a$ represents, for example, an alkyl group having 1 to 8 carbon atoms. The description and preferable range of the alkyl group represented by $R^a$ can be found in the description and preferable range of the alkyl group represented by X in $T^{11}$. Specific examples of the ester include $CH_3COO-$ and $C_2H_5COO-$. The alkyl group having 1 to 4 carbon atoms represented by Ya, Yb, Yc, and Yd may be linear or branched. Examples of the alkyl group having 1 to 4 carbon atoms include a methyl group, an ethyl group, an n-propyl group, and an isopropyl group.

It is preferable that the divalent aromatic heterocyclic group has a 5-membered, 6-membered, or 7-membered heterocycle. A 5- or 6-membered ring is more preferable, and a 6-membered ring is most preferable. As a heteroatom constituting the heterocycle, a nitrogen atom, an oxygen atom, or a sulfur atom is preferable. It is preferable that the heterocycle is an aromatic heterocycle. In general, the aromatic heterocycle is an unsaturated heterocycle. An unsaturated heterocycle having most double bonds is more preferable. Examples of the heterocycle include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. The description and preferable range of the substituent can be found in the description of the substituent with which the monovalent to tetravalent aromatic hydrocarbon represented by $A^{11}$ or $A^{12}$ is substituted.

$Hb^{11}$ represents a perfluoroalkyl group having 2 to 30 carbon atoms, more preferably a perfluoroalkyl group having 3 to 20 carbon atoms, and still more preferably a perfluoroalkyl group having 3 to 10 carbon atoms. The perfluoroalkyl group may be linear, branched, or cyclic and is preferably linear or branched and more preferably linear.

m11 and n11 each independently represent 0 to 3 and m11+n11≥1. At this time, a plurality of structures in parentheses may be the same as or different from each other and is preferably the same as each other. m11 and n11 in Formula (I) are determined depending on the valences of $A^{11}$ and $A^{12}$, and preferable ranges thereof are determined depending on the preferable ranges of the valences of $A^{11}$ and $A^{12}$.

o and p in $T^{11}$ each independently represent an integer of 0 or more. In a case where o and p represent an integer of 2 or more, a plurality of X's may be the same as or different from each other. o in $T^{11}$ represents preferably 1 or 2. p in $T^{11}$ represents preferably an integer of 1 to 4 and more preferably 1 to 2.

A molecular structure of the compound represented by Formula (I) may be symmetrical or non-symmetrical. "Symmetry" described herein represents at least one of point symmetry, line symmetry, or rotational symmetry, and "non-symmetry" described herein does not represent any one of point symmetry, line symmetry, or rotational symmetry.

The compound represented by Formula (I) is a combination of the perfluoroalkyl group ($Hb^{11}$), the linking groups $-(-Sp^{11}-L^{11}-Sp^{12}-L^{12})m11-A^{11}-L^{13}-$ and $-L^{14}-A^{12}-(L^{15}-Sp^{13}-L^{16}-Sp^{14})n11-$, and preferably the divalent group having an excluded volume effect which is represented by $T^{11}$. Two perfluoroalkyl groups ($Hb^{11}$) present in the molecule are preferably the same as each other, and the linking groups $-(-Sp^{11}-L^{11}-Sp^{12}-L^{12})m11-A^{11}-L^{13}-$ and $-L^{14}-A^{12}-(L^{15}-Sp^{13}-L^{16}-Sp^{14})n11-$ present in the molecule are also preferably the same as each other. $Hb^{11}-Sp^{11}-L^{11}-Sp^{12}-$ and $-Sp^{13}-L^{16}-Sp^{14}-Hb^{11}$ present at the terminal are preferably a group represented by any one of the following formulae:

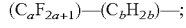

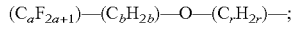

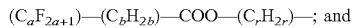

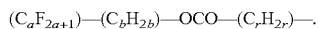

In the above formulae, a represents preferably 2 to 30, more preferably 3 to 20, and still more preferably 3 to 10. b represents preferably 0 to 20, more preferably 0 to 10, and still more preferably 0 to 5. a+b represents 3 to 30. r represents preferably 1 to 10 and more preferably 1 to 4.

In addition, $Hb^{11}-Sp^{11}-L^{11}-Sp^{12}-L^{12}-$ and $-L^{15}-Sp^{13}-L^{16}-Sp^{14}-Hb^{11}$ present at the terminal of Formula (I) are preferably a group represented by any one of the following formulae:

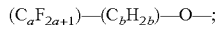

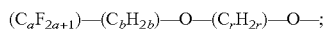

In the above formulae, a, b, and r have the same definitions as described above.

The addition amount of the surfactant in the liquid crystal composition is preferably 0.01 mass % to 10 mass %, more preferably 0.01 mass % to 5 mass %, and still more preferably 0.02 mass % to 1 mass % with respect to the total mass of the liquid crystal compound.

(Other Additives)

In addition, the liquid crystal composition may include at least one selected from various additives such as a polymerizable monomer. In addition, optionally, a polymerization inhibitor, an antioxidant, an ultraviolet absorber, a light stabilizer, a coloring material, metal oxide particles or the like can be added to the liquid crystal composition in a range where optical performance does not deteriorate.

A cholesteric liquid crystal structure in which cholesteric regularity is immobilized can be formed by dissolving the polymerizable liquid crystal compound, the chiral agent, and the polymerization initiator and further the optionally added surfactant or the like in a solvent to prepare a liquid crystal composition, applying the liquid crystal composition to the support, the underlayer, the previous prepared cholesteric liquid crystal layer (pitch gradient layer), or the like, drying the liquid crystal composition to obtain a coating film, and irradiating the coating film with an actinic ray for polymerization to obtain a cholesteric liquid crystal composition. A laminated film including a plurality of cholesteric liquid crystal layers can be formed by repeating the above-described manufacturing steps of the cholesteric liquid crystal layer.

(Solvent)

The solvent used for preparing the liquid crystal composition is not particularly limited and can be appropriately selected depending on the purpose. An organic solvent is preferably used.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. As the organic solvent, one kind may be used alone, or two or more kinds may be used in combination. Among these, a ketone is more preferable in consideration of an environmental burden.

(Application, Alignment, Polymerization)

A method of applying the liquid crystal composition is not particularly limited and can be appropriately selected depending on the purpose. Examples of the method of applying the liquid crystal composition include a wire bar coating method, a curtain coating method, an extrusion coating method, a direct gravure coating method, a reverse gravure coating method, a die coating method, a spin coating method, a dip coating method, a spray coating method, and a slide coating method. In addition, the application can also be realized by transferring the liquid crystal composition that is separately applied to the support. In addition, droplets of the liquid crystal composition can also be jetted. As the jetting method, an ink jet method can be used.

By heating the applied liquid crystal composition, liquid crystal molecules are aligned. The heating temperature is preferably 200° C. or lower and more preferably 130° C. or lower. Due to the alignment treatment, a structure in which the polymerizable liquid crystal compound is twisted to have a helical axis in a direction substantially perpendicular to the film surface can be obtained.

(Curing of Liquid Crystal Composition)

By further polymerizing the aligned liquid crystal compound, the liquid crystal composition can be cured. Regarding the polymerization, thermal polymerization or photopolymerization using light irradiation may be performed, and photopolymerization is preferable. Regarding the light irradiation, ultraviolet light is preferably used. The illuminance is preferably 100 mW/cm$^2$ to 1,500 mW/cm$^2$ and more preferably 100 mW/cm$^2$ to 600 mJ/cm$^2$. The irradiation energy is preferably 20 mJ/cm$^2$ to 50 J/cm$^2$ and more preferably 100 mJ/cm$^2$ to 1500 mJ/cm$^2$. It is preferable that ultraviolet light is emitted from a light source having an emission wavelength of 200 nm to 430 nm, and it is preferable that ultraviolet light is emitted from a light source having an emission wavelength of 300 nm to 430 nm. In addition, from the viewpoint of preventing a decomposition or side reaction of a material to be used, for example, a wavelength cut filter can be used to suppress the transmittance of light having a wavelength of 300 nm or shorter to be 20% or lower.

In an aspect of the present invention, in order to promote the change of the helical pitch of the liquid crystal composition in the thickness direction, it is preferable that the photoisomerization of the chiral agent and the curing are performed at the same time. The photoisomerization of the chiral agent refers to a phenomenon in which the HTP of the chiral agent changes during light irradiation. That is, by irradiating the liquid crystal composition with light such that the HTP of the chiral agent in the liquid crystal composition changes in the thickness direction, the pitch gradient layer in which the helical pitch changes in the thickness direction can be formed. At this time, it is preferable that the promotion of the change of the helical pitch of the liquid crystal composition in the thickness direction and the curing of the liquid crystal composition are performed at the same time.

In order to promote back isomerization or dimerization of the chiral agent during ultraviolet irradiation and the change of the helical pitch of the liquid crystal composition caused by the change of the helical twisting power (HTP) during the isomerization or dimerization of the chiral agent, it is preferable that the light irradiation is performed under heating conditions. In order to promote a photopolymerization reaction, it is preferable that light irradiation is performed under heating conditions or in a low oxygen atmosphere. In order to prevent the cholesteric liquid crystal layer from being disordered, it is the temperature during the ultraviolet irradiation is preferably maintained in a temperature range of the cholesteric liquid crystal layer, and the temperature is preferably 25° C. to 140° C. and more preferably 40° C. to 120° C. In addition, regarding the oxygen concentration during the ultraviolet irradiation, it is preferable that the oxygen concentration in the atmosphere decreases using a method such as nitrogen substitution. The oxygen concentration is preferably 3.0% or lower, more preferably 0.5% or lower, and still more preferably 0.2% or lower. From the viewpoint of stability, the polymerization degree is preferably high, and is preferably 50% or higher and more preferably 60% or higher. The polymerization degree can be determined by measuring a consumption ratio between polymerizable functional groups using an IR absorption spectrum.

In the present invention, a method of forming the pitch gradient layer is not limited to the method of simultaneously performing the curing of the liquid crystal composition and the promotion the change of the helical pitch of the liquid crystal composition in the thickness direction using the chiral agent in which HTP changes with light as described above. Preferable examples of another method of forming the pitch gradient layer include a method of performing the curing of the liquid crystal composition after performing the promotion the change of the helical pitch of the liquid crystal composition in the thickness direction by allowing a wavelength of light used for isomerizing the chiral agent and a wavelength of light for curing the liquid crystal composition to be different from each other (using a polymerization initiator that is not reactive to the wavelength of the light used for isomerizing the chiral agent). In addition, other methods of forming the pitch gradient layer in the related art, such as a method of laminating a plurality of cholesteric liquid crystal layers in which a helical pitch changes stepwise can be appropriately used.

[Support]

The reflective sheet according to the embodiment of the present invention may include a support. In order to prepare the reflective sheet according to the embodiment of the present invention, a support (peelable support) having peelability may also be used. The peelable support is peeled during joining to other decorative sheets or an optical device or during the preparation of an image display device or an interior member for the interior of an automobile.

Examples of the support or the peelable support include a plastic film formed of polyester such as polyethylene terephthalate (PET), polycarbonate, an acrylic resin, an epoxy resin, a polyurethane, a cycloolefin resin, a polyamide, a polyolefin, a cellulose derivative, a silicone, or the like.

As a non-peelable support, a film including a film formed of a cellulose derivative, a cycloolefin resin, or polyethylene terephthalate is preferable.

As the peelable support, a film formed of a film including a polyethylene terephthalate is preferable.

The thickness of the non-peelable support is preferably 20 μm or more and more preferably 40 μm or more. The thickness of the peelable support is preferably 50 μm or more, more preferably 70 μm or more, and still more preferably 80 μm or more. By adjusting the thickness of the peelable support as a substrate during the formation of the pitch gradient layer to be 50 μm or more, the pitch gradient layer having no unevenness can be formed. The upper limit of the thickness of the peelable support is not particularly limited, and is preferably 1000 μm or less, more preferably 500 μm or less, and still more preferably 300 μm or less.

[Undercoat Layer]

In the reflective sheet according to the embodiment of the present invention, an undercoat layer that is obtained by applying an amorphous composition including a (meth) acrylate monomer to the support surface and curing the amorphous composition may be provided, and a cholesteric liquid crystal layer may be provided on a surface of the undercoat layer.

In a case where the cholesteric liquid crystal layer is formed on the undercoat layer surface, the in-plane alignment direction of liquid crystals in contact with the undercoat layer is random due to physical properties of the undercoat layer. Therefore, the wavy structure of the cholesteric liquid crystal layer formed by applying the liquid crystal composition to the undercoat layer surface can be freely changed. In a case where the cholesteric liquid crystal layer is formed on the liquid crystal layer having the wavy structure, a layer having a wavy structure can also be formed. As a result, the cholesteric liquid crystal layer having diffusion reflection properties can be obtained. For example, even in a case where the reflective sheet for use as a decorative sheet is observed in a direction deviating from specular reflection, sufficient brilliance can be obtained.

The thickness of the undercoat layer is preferably 0.01 μm to 5.0 μm and more preferably 0.05 μm to 3.0 μm.

[Method of manufacturing Reflective Sheet]

A method of manufacturing an optical film according the embodiment of the present invention is a method of manufacturing the above-described reflective sheet, the method including:

a step of forming a pitch gradient layer in which a helical pitch changes in a thickness direction using a liquid crystal composition including a chiral agent in which a helical twisting power changes with light, a polyfunctional liquid crystal compound, and a photopolymerization initiator, in which the chiral agent has a molar absorption coefficient of 30000 or higher at a wavelength of 313 nm, and by irradiating the liquid crystal composition with light in the step, the chiral agent is photoisomerized to induce the change of the helical pitch in the thickness direction.

As described above, in the present invention, the liquid crystal composition for forming the pitch gradient layer includes the chiral agent in which the helical twisting power (HTP) changes with light, and in a case where the liquid crystal composition (chiral agent) is irradiated with light the HTP of chiral agent changes in the thickness direction. As a result, the pitch gradient layer in which the helical pitch changes in the thickness direction can be formed.

Here, in the manufacturing method according to the embodiment of the present invention, it is preferable that the change of HTP of the chiral agent by light irradiation and the curing of the liquid crystal composition by light (active energy ray) irradiation are simultaneously performed.

At this time, by adjusting the content of the photopolymerization initiator to be 0.3 wt % or lower with respect to the content of the polyfunctional liquid crystal compound, the time required to cure the liquid crystal composition can be increased. Further, by using a chiral agent having a molar absorption coefficient of 30000 or higher at a wavelength of 313 nm as the chiral agent, the change of HTP of the chiral agent is likely to occur.

As a result, the time required to completely cure the liquid crystal composition is delayed, a difference in the irradiation dose of light between the upper side and the lower side of the liquid crystal composition increases, and the amount of the change of HTP of the chiral agent is increased relative to the irradiation dose of the light. As a result, a difference in the amount of the change of HTP of the chiral agent between the upper side and the lower side of the liquid crystal composition can be increased, and the pitch gradient layer in which the amount of the change of the helical pitch in the thickness direction is large can be obtained. That is, the pitch gradient layer in which the wavelength range of selective reflection is wide can be obtained.

In the other preferable manufacturing method, light irradiation for curing the pitch gradient layer is performed after performing light irradiation for changing the HTP of the chiral agent. At this time, by adjusting the content of the photopolymerization initiator to be 0.3 wt % or higher with respect to the polyfunctional liquid crystal compound, the irradiation dose required to cure the liquid crystal composition can be reduced.

In addition, in the step of forming the pitch gradient layer, the liquid crystal composition may be exposed for patterning.

[Decorative Sheet]

As described above, the reflective sheet according to the embodiment of the present invention can be suitably used as a decorative sheet.

The decorative sheet according to the embodiment of the present invention can also be used as a decorative sheet that makes an element using external light such as a camera or a sensor inconspicuous to the user. In this case, it is preferable that the decorative sheet includes: the above-described reflective sheet; and a wavelength selective filter in which a transmittance at a wavelength of 400 to 630 nm is lower than 1%.

[Optical Device]

The reflective sheet according to the embodiment of the present invention may also be used for an optical device including: the reflective sheet; and an element using light transmitted through the reflective sheet. In the optical device, by using the reflective sheet according to the embodiment of the present invention, light reflected from a surface or the like of the element using light transmitted through the reflective sheet can be prevented from reaching the outside of the optical device, and thus the element using light transmitted through the reflective sheet can be made to be inconspicuous.

In addition, it is also preferable that the reflective sheet according to the embodiment of the present invention is disposed on a surface of the element using light transmitted through the reflective sheet.

[Element using Light transmitted through Reflective Sheet]

The element using light transmitted through the reflective sheet used in the present invention is not particularly limited, and various elements such as an image pickup element or a sensor can be used. In this aspect, by using the reflective sheet according to the embodiment of the present invention as a decorative sheet having a configuration in which an SC filter (ultraviolet absorbing filter; manufactured by Fujifilm Corporation) and an IR filter (manufactured by Fujifilm Corporation) are bonded to each other, decoration corresponding to a light receiving wavelength of an image pickup element, a sensor, or the like can be made, which is preferable.

<Image Display Device>

An image display device including the reflective sheet according to the embodiment of the present invention and an image display element may be provided.

[Image Display Element]

The image display element used in the present invention is not particularly limited as long as it is an image display element that is typically used. Various display elements and light source members such as a liquid crystal cell or an organic EL display element can be used as the image display element.

EXAMPLES

Hereinafter, the present invention will be described in detail using Examples. Materials, reagents, amounts thereof, proportions thereof, operations, and the like shown in the following examples can be appropriately changed as long as they do not depart from the scope of the present invention. Accordingly, the present invention is not limited to the following examples.

Comparative Example 1

Preparation of Undercoat Layer 1

A PET film (COSMOSHINE A4100, manufactured by Toyobo Co., Ltd.) having a thickness of 50 μm was prepared as a support and was used as a transparent support 1. An undercoat layer-forming coating solution 1 having the following composition was applied to a surface of the transparent support 1 where an easily adhesive layer was not provided using a #3.6 wire bar coater. Next, the laminate was applied was dried at 45° C. for 60 seconds and was irradiated with ultraviolet light at 500 mJ/cm² at 25° C. using an ultraviolet irradiation device. As a result, the transparent support 1 with the undercoat layer was prepared.

| (Undercoat Layer-Forming Coating Solution 1) | |
|---|---|
| KAYARAD PET30 (manufactured by Nippon Kayaku Co., Ltd.) | 100 parts by mass |
| IRGACURE 907 (manufactured by Ciba-Geigy) | 3.0 parts by mass |
| KAYACURE DETX (manufactured by Nippon Kayaku Co., Ltd.) | 1.0 parts by mass |
| Surfactant F1 having the following structure | 0.01 parts by mass |
| Methyl isobutyl ketone | 243 parts by mass |

Surfactant F1

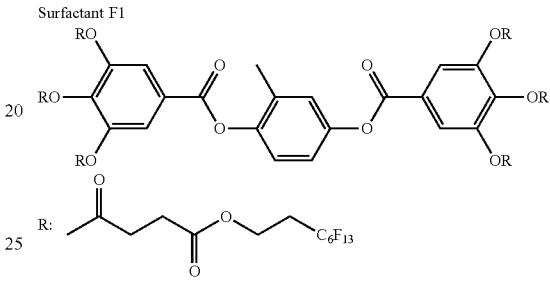

Preparation of Forming Cholesteric Liquid Crystal Layer Ch1

A composition shown below was stirred and dissolved in a container held at 25° C. to prepare a cholesteric liquid crystal layer-forming coating solution Ch1.

| (Cholesteric Liquid Crystal Layer-Forming Coating Solution Ch1) | |
|---|---|
| Methyl ethyl ketone | 122.7 parts by mass |
| Cyclohexanone | 21.7 parts by mass |
| Mixture of the following rod-shaped liquid crystal compounds | 100.0 parts by mass |
| IRGACURE 907 (manufactured by Ciba-Geigy) | 0.0375 parts by mass |
| KAYACURE DETX (manufactured by Nippon Kayaku Co., Ltd.) | 0.0125 parts by mass |
| Chiral agent A having the following structure | 6.59 parts by mass |
| Surfactant F1 having the above-described structure | 0.027 parts by mass |
| Surfactant F2 having the following structure | 0.067 parts by mass |

Rod-Shaped Liquid Crystal Compound

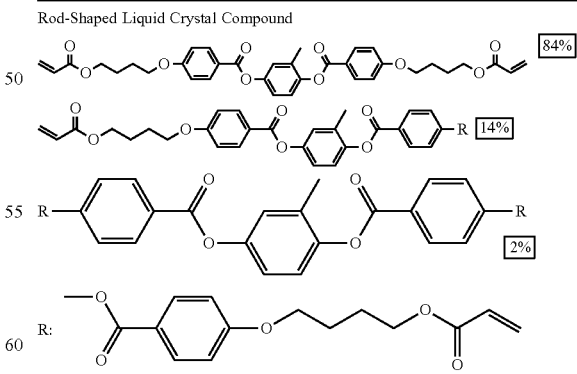

Numerical values are represented by mass %. In addition, R represents a group to be bonded to an oxygen atom. In addition, an average molar absorption coefficient of the rod-shaped liquid crystal compound at a wavelength of 300 to 400 nm was 140 /mol·cm.

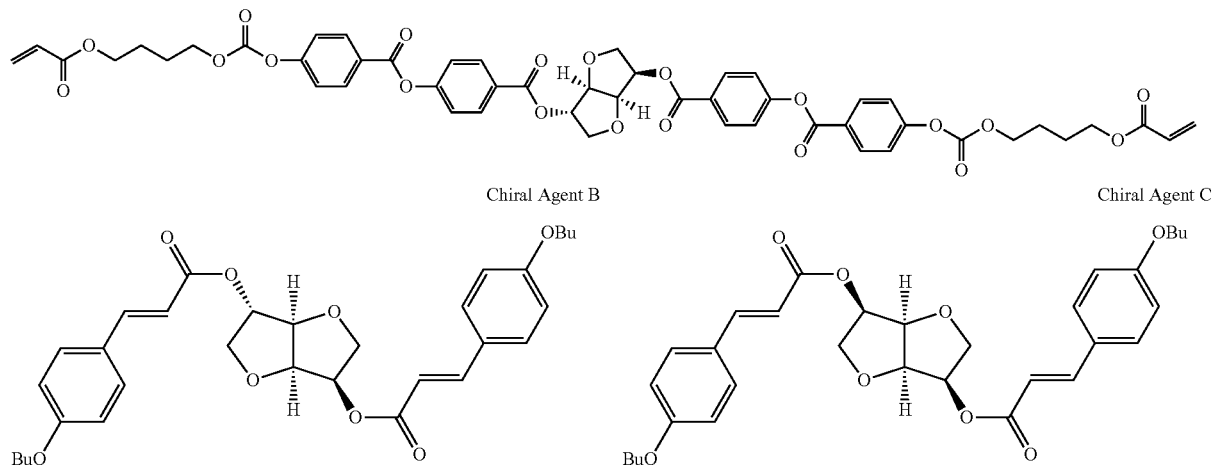

The chiral agents A and B are chiral agents that form a right-handed helix. The chiral agent C is a chiral agent that forms a left-handed helix. In addition, the chiral agents B and C are chiral agents having a cinnamate group.

Regarding each of the chiral agents A to C, a molar absorption coefficient ε, a maximum wavelength at which the molar absorption coefficient is maximum is obtained, and a molar absorption coefficient at a wavelength of 313 nm are shown in Table 1 below.

TABLE 1

|  | εMAχ | Maximum Wavelength | ε@313 | Cinnamate Group |
|---|---|---|---|---|
| Chiral Agent A | 70300 | 296 nm | 35000 | None |
| Chiral Agent B | 56000 | 314 nm | 55000 | Present |
| Chiral Agent C | 54000 | 312 nm | 53000 | Present |

The cholesteric liquid crystal layer-forming coating solution Ch1 prepared as described above was applied to a surface of the transparent support 1 with the undercoat layer using a #14 wire bar coater. Next, the obtained coating film was dried at 105° C. for 60 seconds and was irradiated with ultraviolet light using an ultraviolet irradiation device at 130 mW/cm$^2$ and 500 mJ/cm$^2$ at 85° C. at an oxygen concentration of 200 ppm or lower. As a result, a cholesteric liquid crystal layer Ch1 was prepared.

Comparative Example 2 and Examples 1 to 15

Reflective sheets according to Comparative Examples and Examples were prepared using the same method as in Comparative Example 1, except that the conditions were changed as shown in Tables 2 and 3 below. The respective layer conditions of Examples and Comparative Examples are shown in Tables 2 and 3. The support, the kind and addition amount of the chiral agent, and the amount of the polymerization initiator used for the preparation of each of Comparative Example 2 and Examples 1 to 15 are shown in Tables 2 and 3. In addition, ultraviolet curing conditions used for forming the cholesteric liquid crystal layer in each of Comparative Examples and Examples are shown in Tables 2 and 3. In Examples 10 to 15, two cholesteric liquid crystal layers were formed using a method shown in Table 3. In addition, in Example 9, the addition amounts of the surfactants F1 and F2 were 0.1 times those of Comparative Example 1.

The first and second cholesteric liquid crystal layers were formed using a mixed solvent in which methyl ethyl ketone and cyclohexanone were mixed at 85:15, and the bar number and the solid content were adjusted so as to have the thicknesses shown in Tables 2 and 3. The second cholesteric

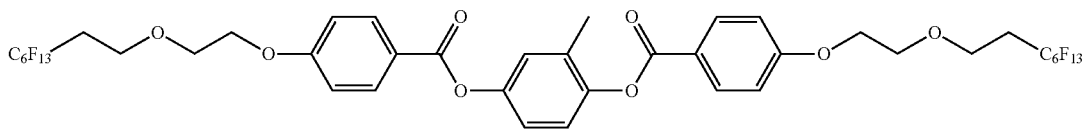

liquid crystal layer was formed by applying the cholesteric liquid crystal layer-coating solution to the first cholesteric liquid crystal layer using the same method as that of the cholesteric liquid crystal layer Ch1.

In each of Comparative Examples and Examples, as the polymerization initiator, two polymerization initiators including IRGACURE 907 and KAYACURE DETX were used at a ratio of 3:1 as in Comparative Example 1. Table 2 shows the total value of the two initiators.

As a transparent support 2, a TAC film (TG40UL, manufactured by Fujifilm Corporation) having a thickness of 41 μm was used.

Comparative Example 3

Preparation of Alignment Film 1

An alignment layer-forming coating solution Y1 having the following composition was applied to a surface of the transparent support 1 using a #16 wire bar coater. Next, the coating film was dried at 60° C. for 60 seconds and dried at 90° C. for 150 seconds. Next, the coating surface side was rubbed by being rotated using a rubbing roll in a direction parallel to the transport direction at a clearance of 1.0 mm and at 1000 rev/min. As a result, the transparent support 1 with the alignment layer 1 was prepared.

| (Alignment Layer-Forming Coating Solution Y1) | |
| --- | --- |
| The following modified polyvinyl alcohol | 10 parts by mass |
| Water | 370 parts by mass |
| Methanol | 120 parts by mass |
| Glutaraldehyde (crosslinking agent) | 0.5 parts by mass |

$-(CH_2CH)_{86.3}-(CH_2-CH)_{12}-(CH_2-CH)_{1.7}-$
| | | |
OH   OCOCH$_3$   OCONHCH$_2$CH$_2$OCOC=CH$_2$
                                              |
                                             CH$_3$

The cholesteric liquid crystal layer-forming coating solution Ch1 was applied to a surface of the transparent support 1 with the alignment film 1 using a #14 wire bar coater. Next, the obtained coating film was dried at 105° C. for 60 seconds and was irradiated with ultraviolet light using an ultraviolet irradiation device at 130 mW/cm$^2$ and 500 mJ/cm$^2$ at 85° C. at an oxygen concentration of 200 ppm or lower. As a result, a cholesteric liquid crystal layer Ch23 was prepared.

Further, the undercoat layer coating solution 1 was applied to the cholesteric liquid crystal layer Ch23 using a #3.6 wire bar coater. Next, the laminate was applied was dried at 45° C. for 60 seconds and was irradiated with ultraviolet light at 500 mJ/cm$^2$ at 25° C. using an ultraviolet irradiation device. As a result, the undercoat layer 1 was prepared on the cholesteric liquid crystal layer Ch23.

Preparation of Forming Cholesteric Liquid Crystal Layer Ch24

A composition shown below was stirred and dissolved in a container held at 25° C. to prepare a cholesteric liquid crystal layer-forming coating solution Ch24.

| (Cholesteric Liquid Crystal Layer-Forming Coating Solution Ch24) | |
| --- | --- |
| Methyl ethyl ketone . . . | 122.7 parts by mass |
| Cyclohexanone . . . | 21.7 parts by mass |
| Mixture of the following rod-shaped liquid crystal compounds . . . | 100.0 parts by mass |
| IRGACURE 907 (manufactured by Ciba-Geigy) . . . | 0.075 parts by mass |
| KAYACURE DETX (manufactured by Nippon Kayaku Co., Ltd.) . . . | 0.025 parts by mass |
| Chiral agent A having the above-described structure . . . | 8.52 parts by mass |
| Surfactant F1 having the above-described structure . . . | 0.027 parts by mass |
| Surfactant F2 having the above-described structure . . . | 0.067 parts by mass |

The cholesteric liquid crystal layer-forming coating solution Ch24 prepared as described above was applied to a surface of the undercoat layer 1 formed on the cholesteric liquid crystal layer Ch23 using a #14 wire bar coater. Next, the obtained coating film was dried at 105° C. for 60 seconds and was irradiated with ultraviolet light using an ultraviolet irradiation device at 130 mW/cm$^2$ and 500 mJ/cm$^2$ at 85° C. at an oxygen concentration of 200 ppm or lower. As a result, a reflective sheet according to Comparative Example 3 was prepared.

Example 16

A laminate according to Example 16 was prepared using the same method as in Example 10, except that the first cholesteric liquid crystal layer (Ch25) and the second cholesteric liquid crystal layer (Ch26) were photocured by being irradiated with light from a metal halide lamp at an irradiation dose of 70 mJ at 60° C. through an optical filter SH0350 (manufactured by Asahi Spectra Co., Ltd.) and being further irradiated with light from a metal halide lamp at an irradiation dose of 500 mJ at 100° C.

Evaluation

The results of performing measurement and evaluation using each of the reflective sheets prepared in Examples and Comparative Examples are shown in Tables 4 and 5 below.

Measurement of Wavy Structure of Cholesteric Liquid Crystal Layer

Measurement of Integral Reflectivity

Using a device in which a large integrating sphere device (ILV-471, manufactured by JASCO Corporation) was attached to a spectrophotometer (V-550, manufactured by JASCO Corporation), an integral reflection spectrum of a display member was measured to include specularly reflected light without using optical trap such that light was incident from a cholesteric liquid crystal layer surface of the reflective sheet. In the obtained integral reflection spectrum, a maximum reflectivity in a wavelength range of 400 to 900 nm was obtained as a maximum integral reflectivity.

Measurement of Specular Reflectivity

Using a device in which an absolute reflectivity measurement device (ARV-474, manufactured by JASCO Corporation) was attached to a spectrophotometer (V-550, manufactured by JASCO Corporation), a specular reflection spectrum at an incidence angle of 5° was measured such that light was incident from the cholesteric liquid crystal layer surface of the reflective sheet. In the obtained specular reflection spectrum, a maximum reflectivity in a wavelength range of 400 to 900 nm was obtained as a maximum specular reflectivity.

Half-Width

A half-width was measured from the measured integral reflection spectrum using the above-described method.

$\lambda_1$ and $\lambda_2$ $\lambda_1$ and $\lambda_2$ were obtained from a wavelength $\lambda\alpha$ on a short wavelength side, a wavelength $\lambda\beta$ on a long wavelength side, and a center wavelength $\lambda_C$ that define the half-width.

Relationship of Integral Reflectivity

Using the above-described method, I-R($\lambda_1$) and I-R($\lambda_2$) were calculated from the measured integral reflection spectrum, and a magnitude relationship of the integral reflectivity was evaluated. A case where the following Expression (1) was satisfied was evaluated as Y, and a case where the following Expression (1) was not satisfied was evaluated as N.

$$I-R(\lambda_1) > I-R(\lambda_2) \qquad \text{Expression (1)}$$

Calculation of SCE $SCE(\lambda_1)$ and $SCE(\lambda_2)$ were calculated using the following expressions from the integral reflectivity and the specular reflectivity obtained as described above.

$$SCE(\lambda_1) = I-R(\lambda_1) - S-R(\lambda_1)$$

$$SCE(\lambda_2) = I-R(\lambda_2) - S-R(\lambda_2)$$

Relationship of SCE/I-R

Whether or not the following Expression (2) was satisfied was evaluated based on $I-R(\lambda_1)$, $I-R(\lambda_2)$, $SCE(\lambda_1)$, and $SCE(\lambda_2)$ obtained as described above. A case where the following Expression (2) was satisfied was evaluated as Y, and a case where the following Expression (2) was not satisfied was evaluated as N.

$$SCE(\lambda_1)/I-R(\lambda_1) > SCE(\lambda_2)/I-R(\lambda_2) \qquad \text{Expression (2)}$$

Average Value of Inter-Peak Distances of Wavy Structure

An average value of inter-peak distances of the wavy structure was measured using the above-described measurement method. Here, in the aspect in which two layers were laminated, the average value of the two layers was evaluated.

Correspondence Between Curing Rate and Helical Pitch

Regarding both interfaces of the PG layer, a curing rate and a helical pitch were measured. The curing rate was measured using the above-described measurement method. The helical pitch was calculated from a stripe pattern including bright portions and dark portions in a case where a cross-section was observed using a scanning electron microscope (SEM). Next, the evaluation was performed from the following viewpoints.

A: a helical pitch of a portion having a high curing rate is long, and a helical pitch of a portion having a low curing rate is short B: a helical pitch of a portion having a high curing rate is short, and a helical pitch of a portion having a low curing rate is long C: there is no difference in helical pitch (uniform in the thickness direction)

Absorbance

A sample in which one cholesteric liquid crystal layer according to each of Comparative Examples and Examples was formed on the transparent support 1 was prepared and used as a measurement sample. Using a spectrophotometer (UV-3150, manufactured by Shimadzu Corporation), an absorbance at a wavelength of 313 nm was measured such that light was incident from a cholesteric liquid crystal layer side.

Change of Helical Pitch in Thickness Direction

In a case where a cross-section of the cholesteric layer included in the reflective sheet according to each of Comparative Examples and Examples prepared as described above was observed using a scanning electron microscope (SEM), a helical pitch was calculated from a stripe pattern including bright portions and dark portions and was evaluated from the following viewpoints.

A: the helical pitch changes in the thickness direction
B: the helical pitch does not change in the thickness direction Reflected Color Under a light source including three LEDS having center wavelengths of 450 nm, 545 nm, and 630 nm, respectively, the reflected color of each of the reflective sheets prepared as described above was observed by visual inspection at 40 degrees in an oblique direction from the front surface and was evaluated from the following viewpoints.

A: a change in reflected color cannot be detected
B: a change in reflected color can be detected
C: a change in reflected color is small and is allowable
D: a change in reflected color is large and is not allowable The results are shown in Tables 4 and 5.

TABLE 2

|  |  | Comparative Example 1 | Comparative Example 2 | Comparative Example 3 | Example 1 | Example 2 |
|---|---|---|---|---|---|---|
| Layer Configuration |  |  |  | Ch24 Undercoat Layer 1 |  |  |
|  |  | Ch1 Undercoat Layer 1 Transparent Support 1 | Ch2 Undercoat Layer 1 Transparent Support 1 | Ch23 Alignment Film 1 Transparent Support 1 | Ch3 Undercoat Layer 1 Transparent Support 1 | Ch4 Undercoat Layer 1 Transparent Support 1 |
| Second Layer | Thickness | — | — | 6.1µ | — | — |
|  | Chiral Agent | — | — |  | — | — |
|  | Addition Amount of Chiral Agent | — | — | 8.52 phr | — | — |
|  | Amount of Initiator (Total) | — | — | 0.10 phr | — | — |
| First Layer | Thickness | 6.1µ | 6.1µ | 6.1µ | 4.6µ | 3.2µ |
|  | Chiral Agent | Chiral Agent A | Chiral Agent B | Chiral Agent A | Chiral Agent B | Chiral Agent B |

TABLE 2-continued

|  |  |  |  |  |  |  |
|---|---|---|---|---|---|---|
|  | Addition Amount of Chiral Agent | 6.59 phr | 6.06 phr | 6.59 phr | 6.06 phr | 6.06 phr |
|  | Amount of Initiator (Total) | 0.05 phr | 0.5 phr | 0.05 phr | 0.05 phr | 0.05 phr |
| Ultraviolet Curing Conditions | Temperature during Curing | 85° C. | 85° C. | 85° C. | 85° C. | 85° C. |
|  | Irradiation Dose | 500 mJ | 500 mJ | 500 mJ | 500 mJ | 500 mJ |
|  | Illuminance | 130 mW | 130 mW | 130 mW | 130 mW | 130 mW |
|  | $N_2$ Concentration | <200 ppm | <200 ppm | <200 ppm | <200 ppm | <200 ppm |

|  |  | Example 3 | Example 4 | Example 5 | Example 6 | Example 7 |
|---|---|---|---|---|---|---|
|  | Layer Configuration | Ch5 Undercoat Layer 1 Transparent Support 1 | Ch6 Undercoat Layer 1 Transparent Support 1 | Ch7 Undercoat Layer 1 Transparent Support 1 | Ch8 Undercoat Layer 1 Transparent Support 1 | Ch9 Undercoat Layer 1 Transparent Support 1 |
| Second Layer | Thickness | — | — | — | — | — |
|  | Chiral Agent | — | — | — | — | — |
|  | Addition Amount of Chiral Agent | — | — | — | — | — |
|  | Amount of Initiator (Total) | — | — | — | — | — |
| First Layer | Thickness | 6.1μ | 6.1μ | 6.1μ | 6.1μ | 6.1μ |
|  | Chiral Agent | Chiral Agent B | Chiral Agent B | Chiral Agent B | Chiral Agent B | Chiral Agent C |
|  | Addition Amount of Chiral Agent | 6.06 phr | 6.06 phr | 6.06 phr | 6.06 phr | 12.35 phr |
|  | Amount of Initiator (Total) | 0.02 phr | 0.05 phr | 0.3 phr | 0.05 phr | 0.05 phr |
| Ultraviolet Curing Conditions | Temperature during Curing | 85° C. | 85° C. | 85° C. | 40° C. | 85° C. |
|  | Irradiation Dose | 500 mJ | 500 mJ | 500 mJ | 500 mJ | 500 mJ |
|  | Illuminance | 100 mW | 180 mW | 130 mW | 130 mW | 130 mW |
|  | $N_2$ Concentration | <200 ppm | <200 ppm | <200 ppm | <200 ppm | <200 ppm |

TABLE 3

|  |  | Example 8 | Example 9 | Example 10 | Example 11 | Example 12 |
|---|---|---|---|---|---|---|
| Layer Configuration |  | Ch10 Transparent Support 1 | Ch11 Undercoat Layer 1 Transparent Support 2 | Ch13 Ch12 Undercoat Layer 1 Transparent Support 1 | Ch15 Ch14 Transparent Support 1 | Ch17 Ch16 Undercoat Layer 1 Transparent Support 1 |
| Second Layer | Thickness | — | — | 6.1μ | 6.1μ | 7.2μ |
|  | Chiral Agent | — | — | Chiral Agent C | Chiral Agent C | Chiral Agent C |
|  | Addition Amount of Chiral Agent | — | — | 12.35 phr | 12.35 phr | 12.35 phr |
|  | Amount of Initiator (Total) | — | — | 0.05 phr | 0.05 phr | 0.05 phr |
| First Layer | Thickness | 6.1μ | 6.1μ | 6.1μ | 6.1μ | 7.2μ |
|  | Chiral Agent | Chiral Agent C | Chiral Agent C | Chiral Agent B | Chiral Agent B | Chiral Agent B |
|  | Addition Amount of Chiral Agent | 12.35 phr | 12.35 phr | 6.06 phr | 6.06 phr | 6.06 phr |
|  | Amount of Initiator (Total) | 0.05 phr | 0.05 phr | 0.05 phr | 0.05 phr | 0.05 phr |
| Ultraviolet Curing Conditions | Temperature during Curing | 85° C. | 85° C. | 85° C. | 85° C. | 95° C. |
|  | Irradiation Dose | 500 mJ | 500 mJ | 500 mJ | 500 mJ | 500 mJ |
|  | Illuminance | 130 mW | 130 mW | 130 mW | 130 mW | 130 mW |
|  | $N_2$ Concentration | <200 ppm | <200 ppm | <200 ppm | <200 ppm | <200 ppm |

TABLE 3-continued

|  |  | Example 13 | Example 14 | Example 15 | Example 16 |
|---|---|---|---|---|---|
|  | Layer Configuration | Ch19<br>Ch18<br>Undercoat Layer 1<br>Transparent Support 2 | Ch21<br>Ch20<br>Undercoat Layer 1<br>Transparent Support 2 | Ch22<br>Undercoat Layer 1<br>Transparent Support 1 | Ch26<br>Ch25<br>Undercoat Layer 1<br>Transparent Support 1 |
| Second Layer | Thickness | 7.2μ | 6.1μ | — | 6.1μ |
|  | Chiral Agent | Chiral Agent C | Chiral Agent C | — | Chiral Agent C |
|  | Addition Amount of Chiral Agent | 12.35 phr | 12.35 phr | — | 12.35 phr |
|  | Amount of Initiator (Total) | 0.05 phr | 0.05 phr | — | 0.05 phr |
| First Layer | Thickness | 7.2μ | 6.1μ | 6.1μ | 6.1μ |
|  | Chiral Agent | Chiral Agent B | Chiral Agent B | Chiral Agent B | Chiral Agent B |
|  | Addition Amount of Chiral Agent | 6.06 phr | 6.06 phr | 5.2 phr | 6.06 phr |
|  | Amount of Initiator (Total) | 0.05 phr | 0.05 phr | 0.05 phr | 0.05 phr |
| Ultraviolet Curing Conditions | Temperature during Curing | 95° C. | 85° C. | 85° C. | Two-Stage Exposure |
|  | Irradiation Dose | 500 mJ | 500 mJ | 500 mJ |  |
|  | Illuminance | 130 mW | 130 mW | 130 mW |  |
|  | $N_2$ Concentration | <200 ppm | <200 ppm | <200 ppm |  |

TABLE 4

|  |  | Comparative Example 1 | Comparative Example 2 | Comparative Example 3 | Example 1 | Example 2 | Example 3 | Example 4 | Example 5 | Example 6 | Example 7 |
|---|---|---|---|---|---|---|---|---|---|---|---|
| Evaluation | Maximum Integral Reflectivity [%] | 45 | 45 | 73 | 32 | 34 | 40 | 45 | 45 | 45 | 45 |
|  | Maximum Specular Reflectivity [%] | 12 | 12 | 48 | 12 | 12 | 12 | 12 | 12 | 12 | 12 |
|  | Half-Width [nm] | 62 | 62 | 113 | 113 | 105 | 320 | 173 | 105 | 133 | 180 |
|  | Change of Helical Pitch in Thickness Direction | B | B | A | A | A | A | A | A | A | A |
|  | Average Value [nm] of Inter-Peak Distances of Wavy Structure | 7.3 | 6.9 | 7.3 | 7.2 | 7.2 | 7.3 | 7.2 | 7.6 | 7.3 | 7.1 |
|  | Relationship of Integral Reflectivity | N | N | Y | Y | Y | Y | Y | Y | Y | Y |
|  | Relationship of SCE/I-R | N | N | N | Y | Y | Y | Y | Y | Y | Y |
|  | Absorbance of Ch2 | — | — | >5 | — | — | — | — | — | — | — |
|  | Absorbance of Ch1 | 2.5 | 3.8 | 2.0 | 2.9 | 2 | 3.8 | 3.8 | 3.8 | 3.8 | >5 |
|  | Correspondence between Curing Rate and Helical Pitch | C | C | A | A | A | A | A | A | A | A |
|  | Reflected Color | D | D | D | B | C | A | A | C | A | A |

TABLE 5

|  |  | Example 8 | Example 9 | Example 10 | Example 11 | Example 12 | Example 13 | Example 14 | Example 15 | Example 16 |
|---|---|---|---|---|---|---|---|---|---|---|
| Evaluation | Maximum Integral Reflectivity [%] | 45 | 45 | 82 | 82 | 90 | 90 | 82 | 45 | 83 |
|  | Maximum Specular Reflectivity [%] | 22 | 12 | 16 | 31 | 16 | 16 | 16 | 12 | 15 |
|  | Half-Width [nm] | 180 | 180 | 175 | 175 | 190 | 190 | 175 | 105 | 132 |

TABLE 5-continued

| | Example 8 | Example 9 | Example 10 | Example 11 | Example 12 | Example 13 | Example 14 | Example 15 | Example 16 |
|---|---|---|---|---|---|---|---|---|---|
| Change of Helical Pitch in Thickness Direction | A | A | A | A | A | A | A | A | A |
| Average Value [nm] of Inter-Peak Distances of Wavy Structure | 37 | 4.3 | 7.3 | 46 | 7.2 | 7.2 | 8.9 | 8.1 | 7.2 |
| Relationship of Integral Reflectivity | Y | Y | Y | Y | Y | Y | Y | Y | Y |
| Relationship of SCE/I-R | Y | Y | Y | Y | Y | Y | Y | Y | Y |
| Absorbance of Ch2 | — | — | >5 | >5 | >5 | >5 | >5 | — | >5 |
| Absorbance of Ch1 | >5 | >5 | 3.8 | 3.8 | 4.5 | 3.8 | 3.8 | 2.6 | 3.8 |
| Correspondence between Curing Rate and Helical Pitch | A | A | A | A | A | A | A | A | A |
| Reflected Color | A | A | A | A | A | A | A | C | A |

It can be seen from Tables 2 to 5 that, in the reflective sheets according to the embodiment of the present invention, the half-width was large, that is, selective reflection was exhibited in a wide wavelength range and a change in tint depending on angles at which light was visually recognized was small as compared to Comparative Examples.

On the other hand, it can be seen that, in Comparative Examples 1 and 2, the half-width was small and the reflection wavelength was not able to be widened. In addition, it can be seen that, in Comparative Example 3, selective reflection was exhibited in a wide wavelength range, but a change in tint depending on angles at which light was visually recognized was large.

It can be seen from Tables 2 to 5 that, in the reflective sheets according to the embodiment of the present invention, the half-width was 100 nm or more and a change in tint depending on angles at which light was visually recognized was small. It can be seen from a comparison between Examples 1 and 2 that, in a case where the half-width was 110 nm, a change in tint was able to be further reduced. In addition, it can be seen from a comparison between Examples 1 and 6 that, in a case where the half-width was 130 nm, a change in tint was able to be reduced to the extent that the change was actually not able to be detected.

Example 17

The cholesteric liquid crystal layer-forming coating solution according to Example 3 was applied to a surface of the transparent support 1 with the undercoat layer using a #14 wire bar coater. Next, the obtained coating film was dried at 105° C. for 60 seconds and was irradiated with ultraviolet light using an ultraviolet irradiation device through an exposure mask at 130 mW/cm$^2$ and 500 mJ/cm$^2$ at 25° C. at an oxygen concentration of 200 ppm or lower. Next, the exposure mask was removed, and the coating film was irradiated with ultraviolet light using an ultraviolet irradiation device at 130 mW/cm$^2$ and 500 mJ/cm$^2$ at 85° C. at an oxygen concentration of 200 ppm or lower. In a portion that was irradiated with ultraviolet light during the first exposure, the helical pitch in the thickness direction was not present. On the other hand, in a portion that was not irradiated with ultraviolet light due to the exposure mask during the first exposure, a change of the helical pitch in the thickness direction was induced, and the helical pitch on the light irradiation side was widened. Using this method, a reflective sheet in which an in-plane pattern including silver and blue was formed was prepared.

The prepared reflective sheet was bonded to a visible cut filter IR-80 (manufactured by Fujifilm Corporation) using a pressure sensitive adhesive (SK-2057, manufactured by Soken Chemical & Engineering Co., Ltd.) to prepare a decorative sheet. It was found that, by disposing the decorative sheet before an infrared camera, the camera was not able to be visually recognized from the decorative sheet side without deterioration in the function of the infrared camera. Even in a case where SC-66 (manufactured by Fujifilm Corporation) was used as the visible cut filter, similarly, it was found that the camera was not able to be visually recognized from the decorative sheet side without deterioration in the function of the infrared camera.

As can be seen from the above results, the effects of the present invention are obvious.

EXPLANATION OF REFERENCES

10: reflective sheet
12: support
14: undercoat layer
16: pitch gradient layer
B: bright portion
D: dark portion

What is claimed is:

1. A reflective sheet comprising:
   at least one cholesteric liquid crystal layer having wavelength selective reflection properties,
   wherein at least one of the cholesteric liquid crystal layers is a pitch gradient layer in which a helical pitch changes in a thickness direction,
   a half-width of an integral reflection spectrum of the reflective sheet is 100 nm or longer, and
   in a case where a wavelength on a short wavelength side that defines the half-width is represented by $\lambda\alpha$, a wavelength on a long wavelength side that defines the half-width is represented by $\lambda\beta$, a center wavelength that defines the half-width is represented by $\lambda_C$, $\lambda_1 = (\lambda\alpha + \lambda_C)/2$, and $\lambda_2 = (\lambda_C + \lambda\beta)/2$, the following Expressions (1) and (2) are satisfied, $$I-R(\lambda_1) > I-R(\lambda_2) \qquad \text{Expression (1)},$$

$$SCE(\lambda_1)/I-R(\lambda_1) > SCE(\lambda_2)/I-R(\lambda_2) \qquad \text{Expression (2)},$$

where I–R($\lambda$) represents an integral reflectivity at a wavelength $\lambda$ nm, and
   SCE($\lambda$) represents a SCE integral reflectivity at a wavelength $\lambda$ nm.

2. The reflective sheet according to claim 1,
   wherein $\lambda_1$ represents a wavelength in a visible range.

3. The reflective sheet according to claim 1,
wherein $\lambda_1$ and $\lambda_2$ represent wavelengths in a visible range.

4. The reflective sheet according to claim 1,
wherein the pitch gradient layer has a stripe pattern including bright portions and dark portions that is observed with a scanning electron microscope in a cross-section, the stripe pattern has a wavy structure, and an average value of inter-peak distances of the wavy structure is 0.5 µm to 50 µm, and
in the integral reflection spectrum of the reflective sheet, I–R($\lambda$) at a wavelength $\lambda$ at which a maximum reflectivity is exhibited is two times or more S–R($\lambda$),
where S–R($\lambda$) represents a specular reflectivity at a wavelength $\lambda$ nm,
the wavy structure refers to a structure in which at least one region M where an absolute value of an inclination angle of a continuous line of bright portions or dark portions in the stripe pattern with respect to a plane of the cholesteric liquid crystal layer is 5° or more is present, and a peak or valley having an inclination angle of 0° is specified at two points most adjacent to each other with the region M interposed between the two points, and
the inter-peak distance the wavy structure is obtained by measuring a distance of the cholesteric liquid crystal layer in a plane direction regarding the peak or valley having an inclination angle of 0° at the two points most adjacent to each other with the region M interposed between the two points and obtaining an average of distance values at all thicknesses in a case where the length of the cholesteric liquid crystal layer in a major axis direction of a cross-section is 100 µm.

5. The reflective sheet according to claim 1,
wherein in the pitch gradient layer, a pitch of a portion having a high curing rate is a long pitch and a pitch of a portion having a low curing rate is a short pitch.

6. The reflective sheet according to claim 1, comprising:
two pitch gradient layers having different senses.

7. The reflective sheet according to claim 1,
wherein in at least one of the pitch gradient layers, an absorbance at a wavelength of 313 nm is 3.2 or higher.

8. The reflective sheet according to claim 1, further comprising:
a support; and
at least one pitch gradient layer in which a helical pitch on a side where the support is present is narrower than a helical pitch on a side opposite to the side where the support is present.

9. A decorative sheet comprising:
the reflective sheet according to claim 1; and
a wavelength selective filter in which a transmittance at a wavelength of 400 to 630 nm is lower than 1%.

10. A method of manufacturing a reflective sheet that is the reflective sheet according to claim 1, the method comprising:
a step of forming a pitch gradient layer in which a helical pitch changes in a thickness direction using a liquid crystal composition including a chiral agent in which a helical twisting power changes with light, a polyfunctional liquid crystal compound, and a photopolymerization initiator,
wherein the chiral agent has a molar absorption coefficient of 30000 or higher at a wavelength of 313 nm, and
by irradiating the liquid crystal composition with light in the step, the chiral agent is photoisomerized to induce the change of the helical pitch in the thickness direction.

11. The method of manufacturing a reflective sheet according to claim 10,
wherein a content of the photopolymerization initiator is 0.3 wt % or lower with respect to the polyfunctional liquid crystal compound.

12. The method of manufacturing a reflective sheet according to claim 10,
wherein the polyfunctional liquid crystal compound has two or more polymerizable groups and has an average molar absorption coefficient of lower than 5000 at 300 nm to 400 nm.

13. The method of manufacturing a reflective sheet according to claim 10,
wherein the chiral agent has a cinnamoyl group.

14. The method of manufacturing a reflective sheet according to claim 10,
wherein the chiral agent is a compound not having a polymerizable group.

15. The method of manufacturing a reflective sheet according to claim 10,
wherein the step includes a step of irradiating the liquid crystal composition with ultraviolet light at 100 mW/cm$^2$ or higher at a temperature of 40° C. or higher in an atmosphere having an oxygen concentration of 0.2% or lower.

16. The method of manufacturing a reflective sheet according to claim 10,
wherein in the step, the liquid crystal composition is exposed for patterning.

17. The method of manufacturing a reflective sheet according to claim 11,
wherein the chiral agent is a compound not having a polymerizable group.

18. The method of manufacturing a reflective sheet according to claim 12,
wherein the chiral agent is a compound not having a polymerizable group.

19. The method of manufacturing a reflective sheet according to claim 13,
wherein the chiral agent is a compound not having a polymerizable group.

* * * * *